US010203238B2

(12) United States Patent
Barrett et al.

(10) Patent No.: US 10,203,238 B2
(45) Date of Patent: Feb. 12, 2019

(54) LIQUID DETECTION APPARATUS

(71) Applicant: Barrelogix, LLC, Vancouver, WA (US)

(72) Inventors: Philip Dean Barrett, Vancouver, WA (US); Marshal Dean Barrett, Washougal, WA (US); David Holcomb, Salem, OR (US)

(73) Assignee: Barrelogix, LLC, Vancouver, WA (US)

( * ) Notice: Subject to any disclaimer, the term of this patent is extended or adjusted under 35 U.S.C. 154(b) by 140 days.

(21) Appl. No.: 14/638,962

(22) Filed: Mar. 4, 2015

(65) Prior Publication Data

US 2015/0253174 A1 Sep. 10, 2015

Related U.S. Application Data

(60) Provisional application No. 61/949,437, filed on Mar. 7, 2014, provisional application No. 61/976,336, filed
(Continued)

(51) Int. Cl.
*G01F 23/26* (2006.01)
*G01F 23/00* (2006.01)
(Continued)

(52) U.S. Cl.
CPC ............. *G01F 23/263* (2013.01); *C12H 1/22* (2013.01); *C12L 11/00* (2013.01); *G01F 23/0007* (2013.01); *G01F 23/265* (2013.01)

(58) Field of Classification Search
CPC .................................................... G01F 23/263
See application file for complete search history.

(56) References Cited

U.S. PATENT DOCUMENTS

| 5,437,184 A | 8/1995 | Shillady |
| 6,164,132 A * | 12/2000 | Matulek ............... G01F 23/265 |
| | | 73/304 C |

(Continued)

FOREIGN PATENT DOCUMENTS

| DE | 4210737 A1 | 10/1993 |
| DE | 102008064019 A1 | 1/2010 |

(Continued)

OTHER PUBLICATIONS

International Search Report and Written Opinion dated Jul. 10, 2015 in PCT/US2015/018940; 12 pages.
(Continued)

*Primary Examiner* — Lisa Caputo
*Assistant Examiner* — Alex Devito
(74) *Attorney, Agent, or Firm* — DASCENZO Intellectual Property Law, P.C.

(57) ABSTRACT

A liquid detection apparatus for monitoring liquid stored in a wine barrel may include an upper portion configured to be inserted into an opening of the wine barrel and a lower portion configured to extend into the liquid when the upper portion is seated in the opening. A sensing device may be located within the lower portion and at least partially surrounded by a protective layer. The sensing device may be configured to obtain sensed input for the liquid through the protective layer. An alert system may be at least partially located within the upper portion and configured to generate an alert in response to the sensed input obtained by the sensing device.

20 Claims, 35 Drawing Sheets

Related U.S. Application Data on Apr. 7, 2014, provisional application No. 62/010,141, filed on Jun. 10, 2014.

(51) Int. Cl.
*C12H 1/22* (2006.01)
*C12L 11/00* (2006.01)

(56) References Cited

U.S. PATENT DOCUMENTS

| | | |
|---|---|---|
| 6,490,920 B1 | 12/2002 | Netzer |
| 6,871,678 B2 | 3/2005 | Guszloval |
| 7,432,725 B2 | 10/2008 | Sieh |
| 7,470,060 B1 | 12/2008 | Hoben |
| 7,845,224 B2 | 12/2010 | Barlesi et al. |
| 2003/0000303 A1 | 1/2003 | Livingston |
| 2011/0101010 A1 | 5/2011 | Maiocco |
| 2011/0166699 A1 | 7/2011 | Palmquist |

FOREIGN PATENT DOCUMENTS

| | | |
|---|---|---|
| EP | 1312897 B1 | 11/2002 |
| EP | 1462776 A1 | 3/2003 |
| WO | 1998571132 A1 | 12/1998 |
| WO | 200102817 A1 | 1/2001 |
| WO | 200216888 A1 | 2/2002 |
| WO | 2003019119 A1 | 3/2003 |
| WO | 2008119993 A1 | 4/2008 |

OTHER PUBLICATIONS

S.F. Di Gennaro, A. Matese, J. Primicerio, L. Genesio, F. Sabatini, S. Di Blasi and F.P. Vaccari; Wireless real-time monitoring of malolactic fermentation in wine barrels: the Wireless Sensor Bung system; Australian Journal of Grape and Wine Research 19, 20-24, 2013 (5 pages).

\* cited by examiner

| Barrel ID | Liquid Level | pH Level | Brix Content | Temperature | Ejected |
|---|---|---|---|---|---|
| 0019 | 59.95 | 3.34 | 23.01 | 65 | No |
| 0020 | 59.96 | 3.42 | 23.05 | 66 | No |
| 0021 | 59.998 | 3.40 | 23.02 | 67 | No |
| 0022 | 59.992 | 3.44 | 23.03 | 66 | No |
| 0156 | 59.92 | 4.1 | 18.01 | 64 | No |
| 0157 | 59.95 | 4.15 | 18.05 | 63 | No |
| 0158 | 59.997 | 4.11 | 18.15 | 80 | No |
| 0159 | 58.01 | 3.98 | 17.95 | 64 | No |
| 0160 | 59.995 | 3.95 | 17.99 | 63 | No |
| 0161 | 59.982 | 3.96 | 18.20 | 65 | No |
| 0162 | 0.002 | 0 | 0.02 | 68 | Yes |
| 0163 | 59.987 | 3.99 | 18.40 | 70 | No |
| 0164 | 59.957 | 4.01 | 19 | 72 | No |
| 0200 | 59.982 | 3 | 24.25 | 69 | No |
| 0201 | 59.998 | 3.01 | 24.22 | 68 | No |
| 0202 | 54.321 | 3.05 | 24.01 | 66 | No |
| 0203 | 59.852 | 2.95 | 23.80 | 67 | No |
| 0204 | 59.542 | 2.99 | 24.70 | 68 | No |
| 0205 | 59.723 | 3.04 | 23.99 | 64 | No |

FIG. 17

LIQUID DETECTION APPARATUS

RELATED APPLICATIONS

This application claims the benefit of U.S. Provisional Application No. 61/949,437, filed Mar. 7, 2014, U.S. Provisional Application No. 61/976,336, filed Apr. 7, 2014, and U.S. Provisional Application No. 62/010,141, filed Jun. 10, 2014, all of which contents are herein incorporated by reference in their entireties.

BACKGROUND

Various types of liquids may be stored in containers, whether during production, processing, transportation, distribution, sale, or consumption. For example, during the production of wine, beer, or other types of alcohol and/or spirits, the liquid may be stored in a barrel for an extended period of time, which may range from several months to a number of years. During storage in the barrel, the liquid may undergo a process of fermentation, or aging, in preparation for eventual sale, distribution, and/or consumption.

The barrel, or other type of container, may be made of wood, of which oak is a common element for a variety of alcohol types, or other materials. Certain types of containers may not be completely air tight (whether by design, or by limitation) and a certain amount of liquid may escape, evaporate, leak, or otherwise decrease by volume over time. For example, a wood barrel may absorb a certain amount of the liquid over time, may be constructed of a porous wood that allows for the liquid to evaporate over time, or may include small cracks or openings that allow the liquid to leak out of the container.

During the production of some types of alcohol, maintaining a level of liquid while the liquid is stored in a container is beneficial to producing a certain quality or type of alcohol. In some examples, the amount of air which comes into contact with the liquid is kept to a minimum to prevent bacteria from developing on the surface of the liquid. As the liquid escapes, evaporates, leaks, etc., additional liquid may be added to the container at varying frequencies depending on the particular rate of volume loss over time. Different containers, even of the same type, may be associated with different rates of volume loss, and within a single production facility, there may be a considerable variation in frequency of refilling the containers. In some examples, if the level of the liquid within the barrel is not maintained within a desired range, the quality, taste, and/or value of the alcohol is reduced.

Further, certain issues that may arise during storage of an alcohol in a container may be corrected without permanent degradation to the quality of the alcohol if the correction is timely performed. Many of these issues are detected by chemical measurements and visual inspections performed at discrete times throughout the storage process. The current process of manually performing these measurements and inspections can be time consuming for an individual and may result in delay of correcting issues occurring between the discrete inspection times.

SUMMARY

A system and method is disclosed for gathering and processing the data acquired by one or more of the liquid detection apparatuses. Data may be gathered from one or more liquid detection apparatuses located at a single winery or a plurality of wineries at distant locations. The data may be accessed and customized reports may be viewable on a user device. From the data, it may be determined where attention is required and where improvements could be made in the process of storing the liquid.

A smart bung for monitoring liquid stored in a wine barrel may include an upper portion configured to be inserted into an opening of the wine barrel and a lower portion configured to extend into the liquid when the upper portion is seated in the opening. A sensing device may be located within the lower portion and at least partially surrounded by a protective layer. The sensing device may be configured to obtain sensed input for the liquid through the protective layer. An alert system may be at least partially located within the upper portion and configured to generate an alert in response to the sensed input obtained by the sensing device.

A method of managing wine barrels may include determining, by a smart bung, a unique barrel identifier associated with a particular wine barrel. The smart bung may sense information associated with liquid stored in the particular wine barrel. At least a portion of the smart bung may be submerged in the liquid. Further, the smart bung may transmit the information together with the unique barrel identifier to provide a status of the liquid stored in the particular wine barrel.

A floating detection apparatus for monitoring liquid within a container may include an upper portion configured to float above the liquid in the container and a lower portion configured to be submerged in the liquid and to support the upper portion above the liquid. A signaling device may be located in the upper portion and configured to transmit a signal and to receive the signal reflected from an inner surface of the container for determining a level of the liquid within the container. A communication device may be configured to transmit information indicating the level of the liquid.

A system may include a submerged liquid detection apparatus that may be attached to a non-submerged liquid detection apparatus by a tension-bearing tether. The submerged liquid detection apparatus may be configured to perform a measurement of a liquid in which the submerged liquid detection apparatus is submerged and transmit a result of the measurement to the non-submerged liquid detection apparatus via the tension-bearing tether.

A system may include a server that may be configured to receive, from a plurality of liquid detection apparatuses, data associated with measurements of liquids stored in a plurality of containers. The system may further be configured to generate a report from the received data. In some examples, the system may be configured to receive a request for the report, including authorization information, from a user device and transmit the report to the user device in response to verifying the received authorization information allows the user device access to the report.

A capacitive sensing device may include a plurality of vertically stacked rectangular sensors. One or more of the rectangular sensors may have a first sensor height may be configured to measure a first capacitance associated with a level of a liquid. A bottom rectangular sensor may be located below the rectangular sensors and may be a second sensor height that is less than the first sensor height. The bottom rectangular sensor may be configured to a measure a second capacitance associated with a presence of the liquid.

The capacitive sensing device may further include a top rectangular sensor located above the rectangular sensors and may be the same height as the bottom rectangular sensor. The top rectangular sensor may be configured to measure a third capacitance associated with an absence of the liquid.

The second capacitance and the third capacitance may be used for determining a relative permittivity of the liquid. Additionally, the first capacitance and the relative permittivity of the liquid may be used for determining the level of the liquid.

A capacitive sensing device may include a first pair of complementary sensors having a first sensor and a second sensor. The first sensor and the second sensor may be the same geometry and may both extend vertically from a first level to a second level. The first sensor and the second sensor may measure a first set of complementary capacitive measurements associated with a vertical level of an element. A second pair of complementary sensors may be stacked vertically above the first pair of complementary sensors and may include a third sensor and a fourth sensor. The third sensor and the fourth sensor may have the same geometry and may both extend vertically from a third level to a fourth level. The third sensor and the fourth sensor may measure a second set of complementary capacitive measurements associated with the vertical level of the element. A processing device may be configured to determine the level of the element based on the first set of complementary capacitive measurements and the second set of complementary capacitive measurements.

BRIEF DESCRIPTION OF DRAWINGS

FIG. 17 illustrates an example table presenting report data.

DETAILED DESCRIPTION

Mounted Liquid Detection Apparatus

Figure 1:
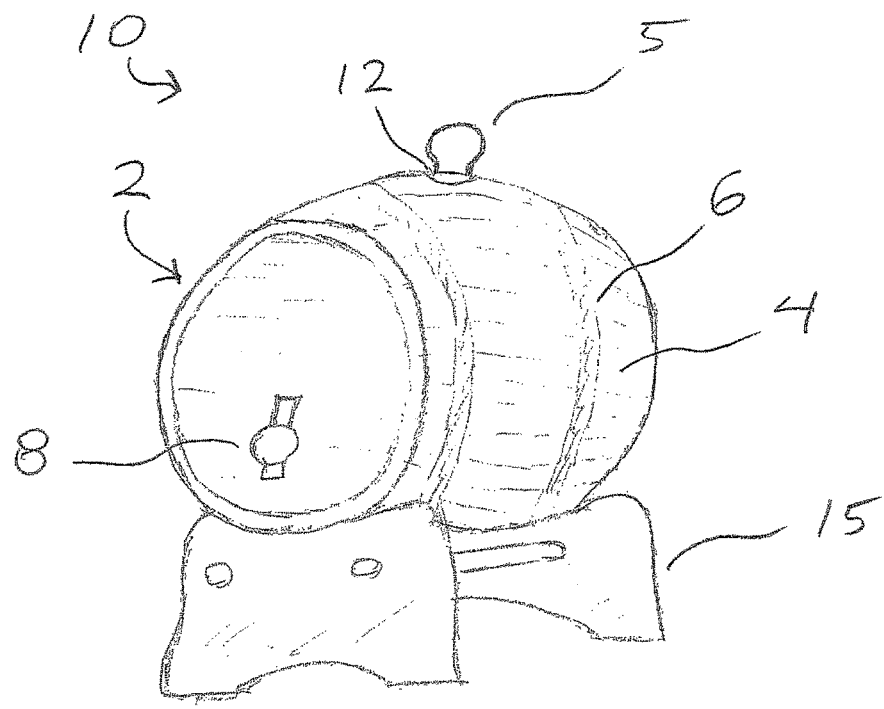
FIG. 1 illustrates an example liquid detection system.

FIG. 1 illustrates an example liquid detection system 10 comprising a container 2, such as a barrel, and a mounted liquid detection apparatus, such as stopper 5. Stopper 5 may comprise a removable bung that may be inserted and/or removed from an opening 12 in container 2. Opening 12 may be used to fill container 2 with liquid and/or provide for a visible inspection of liquid within the container 2. In some examples, container 2 may also comprise a spigot 8 by which liquid may be removed from the container 2.

Container 2 is shown mounted in a reclined position on a stand 15, however in some examples container 2 may be placed in an upright position on either end, including the end opposite spigot 8, or in another angle of desired storage. Mounting container 2 on stand 15 may facilitate access to opening 12 without spilling any liquid and/or may facilitate removal of the liquid by spigot 8.

In some examples, container 2 may comprise a number of slats 4 that may be glued, press-fit, or otherwise affixed to each other to form the shape of a barrel, for example. Additionally, one or more rings 6 may provide structural support of container 2 and/or help maintain a good seal between slats 4. Slats 4 may comprise wood, composite materials, plastic, synthetic materials, other types of structural materials, or any combination thereof. Alternatively, container 2 may be produced of a solid material, such as stainless steel, aluminum, or other types of malleable materials, which may be formed to contain a liquid and have an opening, such as opening 12, for which stopper 5 may be inserted.

Figure 2:
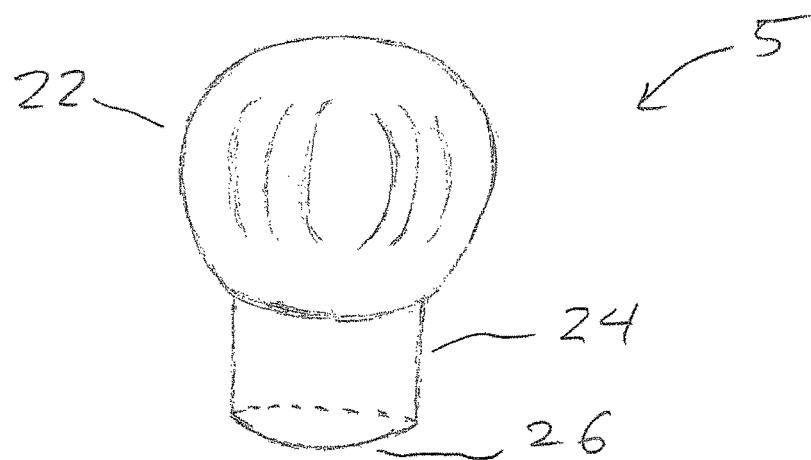
FIG. 2 illustrates an example stopper.

FIG. 2 illustrates an example stopper 25. Stopper 25 may comprise no moving parts in order to reduce wear of stopper 25 and promote ease of cleaning. Further, stopper 25 may be waterproof, such that liquid may not damage electronics housed within stopper 25. Still further, stopper 25 may comprise a sturdy material, such as, but not limited, to a hard rubber, which may withstand harsh conditions presented by operation within a warehouse. In some examples, stopper 25 may comprise a food-grade material, such as food-grade rubber.

Whereas the overall shape of stopper 25, and in particular an upper portion 22 of stopper 25, may be largely aesthetic, a functional aspect of stopper 25 is to provide a seal of opening 12 (FIG. 1). To that end, a lower portion 24 of stopper 25 may be sized to fit snugly into an opening of a container. Lower portion 24 of stopper 25 may be simply press-fit, gently hammered, or lightly placed into the opening. In other examples, lower portion 24 may be threaded such that stopper 25 screws into the opening. Still in other examples, stopper 25 may be hinged, bolted, welded, glued, or comprise other means of attachment to the container and/or to the opening. In some examples, stopper 25 may be tethered to the container and/or the opening, such as by a rope or strap, such that stopper 25 remains attached to the container when removed or ejected from the opening.

Upper portion 22 of stopper 25 is shown as a generally spherical shape which might be grasped by a person's hand, for example, in order to facilitate the insertion into, and/or removal of stopper 25 from, the opening of the container. As discussed above, however, other shapes are contemplated herein. Lower portion 24 of stopper 25 is illustrated as comprising a lower surface 26. Lower surface 26 may comprise a round perimeter shape, and lower portion 24 may be shaped like a peg. Lower surface 26 may be generally flat or with some degree of curvature.

Figure 2B:
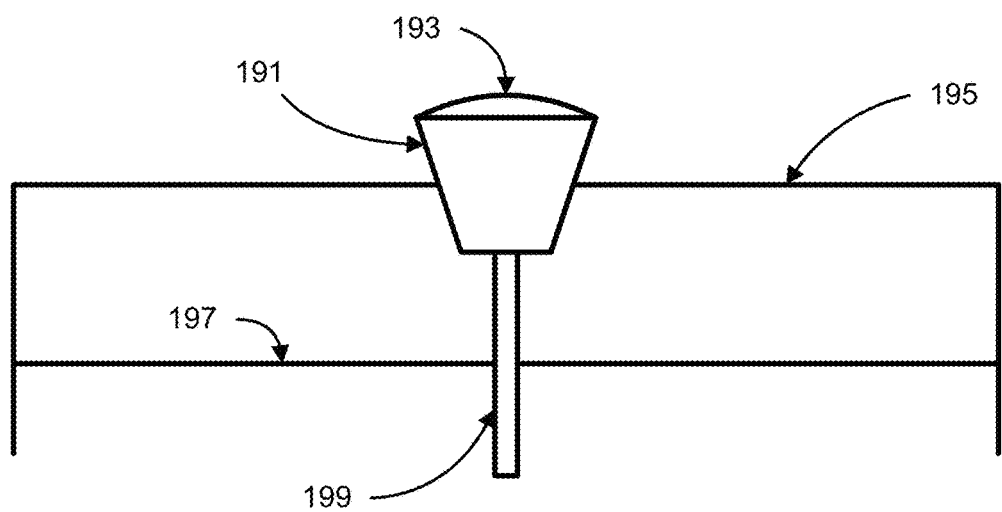
FIG. 2B illustrates an example stopper in a container.

FIG. 2B illustrates an example stopper 191 in a container 195. Stopper 191 comprises an extension 199 which may, at least partially, house a sensing device. In some examples, extension 199 may house a sensing device configured to provide capacitance information as described below. Extension 199 may be configured to extend below liquid level 197 allowing any sensing device housed within extension 199 to measure liquid within container 195.

Stopper 191 may also comprise a switch 193 for toggling power to a liquid detection apparatus, such as liquid detection apparatus 30 (FIG. 3) or liquid detection apparatus 40 (FIG. 4) within stopper 191. Switch 193 may comprise a push button switch or a toggle switch which toggles power in response to a force being applied to switch 193. In some examples, switch 193 may be configured to toggle power in response to sensed motion, such as tapping of stopper 191 a certain amount of times or shaking of stopper 191. Switch 193 may comprise a contact sensor configured to toggle power in response to stopper 191 sensing contact with an object, such as container 195 when installed, or a mating contact. The power toggle control may be configured to prevent liquid from entering stopper 191, thereby protecting the circuitry within stopper 191.

Figure 2C:
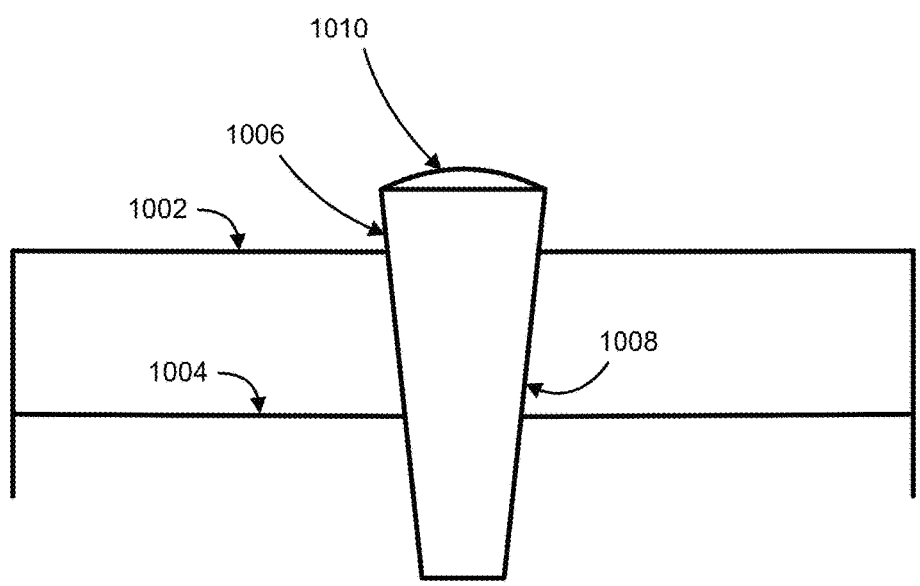
FIG. 2C illustrates a further example stopper in a container.

FIG. 2C illustrates a further example stopper 1006 in a container 1002. Stopper 1006 may be configured to operate similarly to stopper 25 of FIG. 2, stopper 191 of FIG. 2B, or any combination thereof. Stopper 1006 may include an extended lower portion 1008 with sides of the extended lower portion 1008 extending diagonally downward from upper portion 1010.

Extended lower portion 1008 may be configured to extend below liquid level 1004 allowing for extended lower portion 1008 to contact liquid within the container 1002. In some examples, one or more sensing devices may be housed within extended lower portion 1008. Extended lower portion 1008 may also house one or more processing devices and one or more communication devices, as described throughout this disclosure or falling within the scope of the claims.

Figure 2D:
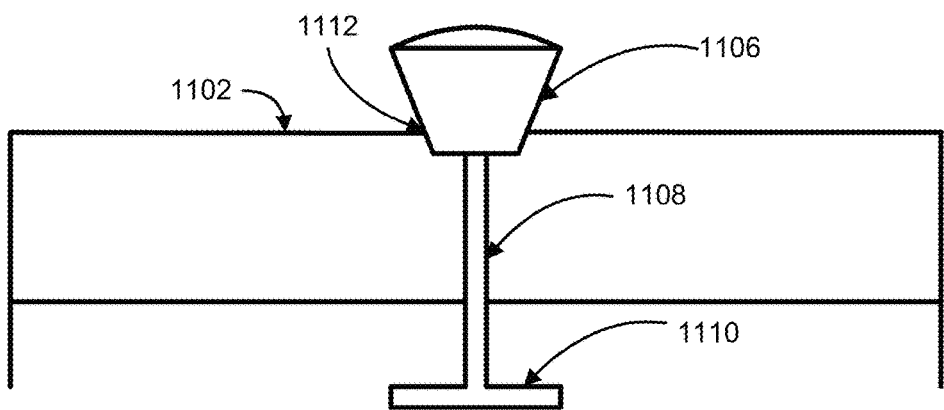
FIG. 2D illustrates an example stopper comprising an ejection-resisting apparatus.

FIG. 2D illustrates an example stopper 1106 comprising an ejection-resisting apparatus 1110, installed in a container 1102. Stopper 1106 may be configured to operate similarly to stopper 25 of FIG. 2, stopper 191 of FIG. 2B, stopper 1006 of FIG. 2C, or any combination thereof. The location of components housed within stopper 1106 may be similar to locations of any of the stoppers described throughout this description.

Stopper 1106 may comprise a lower portion 1108 including ejection-resisting apparatus 1110. Ejection-resisting apparatus 1110 may extend perpendicularly to the lower portion 1108 of stopper 1106, although it is to be understood that the angle of extension of ejection-resisting apparatus 1110 may differ in other examples. Ejection-resisting apparatus 1110 may extend perpendicularly to the lower portion 1108 at a distance greater than the diameter of opening 1112 of the container 1102. The ejection-resisting apparatus 1110 may be attached at a bottom edge of lower portion 1108, however it is to be understood that ejection-resisting apparatus 1110 may be attached anywhere along the length of stopper 1106 in other examples.

During ejection of stopper 1106 from opening 1112, ejection-resisting apparatus 1110 may be configured to contact container 1102 and resist full ejection of stopper 1106 from container 1102. The resistance from full ejection caused by ejection-resisting apparatus 1110 may result in stopper 1106 being located within opening 1112 after ejection, thereby allowing a user to easily locate stopper 1106 after ejection.

Ejection-resisting apparatus 1110 may be rigidly affixed to lower portion 1108. In other examples, ejection-resisting apparatus 1110 may be flexible or may be attached by a mechanism causing ejection-resisting apparatus 1110 to retract in response to some trigger or force applied to ejection-resisting apparatus 1110. For example, ejection-resisting apparatus 1110 may be attached to lower portion 1108 by a hinge mechanism, where ejection-resisting apparatus 1110 may be configured to fold toward or flush with the sides of the lower portion 1108 in response to a user actuating a retraction trigger and remain extended when the retraction trigger is not actuated. In other examples, ejection-resisting apparatus 1110 may be configured to flex or retract in a single direction of applied force corresponding to the direction of installation of stopper 1106, while remaining rigid or extended when force is applied to ejection-resisting apparatus 1110 in a direction opposite from the direction corresponding to the direction of installation.

In some examples, ejection-resisting apparatus 1110 may comprise one or more fingers attached to a portion of the circumference of lower portion 1109. The fingers may extend around less than the entire circumference of lower portion 1108. In other examples, the ejection-resisting apparatus 1110 may comprise by a flange. The flange may be affixed around the circumference of lower portion 1108 and may extend radially outward around the entire circumference of lower portion 1108. It is to be understood that other configurations of the ejection-resisting apparatus 1110 may be utilized that achieve an objective of resisting ejection of stopper 1106.

Figure 2E:
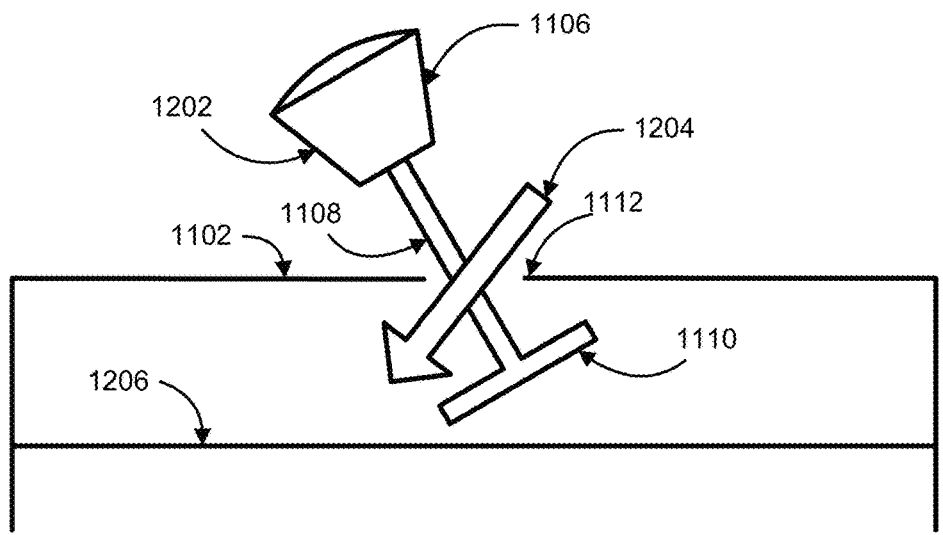
FIG. 2E illustrates the example stopper of FIG. 2D partially removed from the container.

FIG. 2E illustrates the example stopper 1106 of FIG. 2D partially removed from the container 1102. When the stopper 1106 is partially removed from the container 1102, the ejection-resisting apparatus 1110 may remain within container 1102 when an upper portion 1202 of stopper 1106 is removed from opening 1112. A line of sight 1204 to liquid 1206 within container 1102 may exist through opening 1112, thereby allowing visual checking of the liquid 1206. Tilting stopper 1106 when partially removed may increase the size of the line of sight 1204.

Figure 2F:
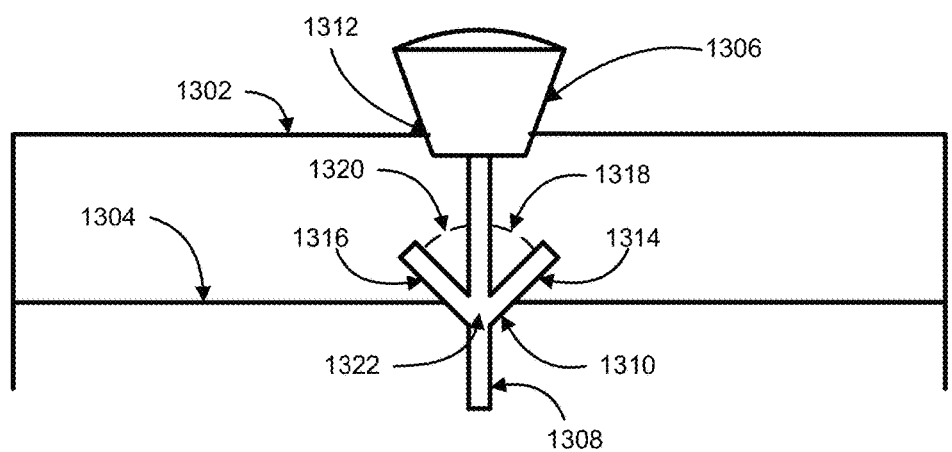
FIG. 2F illustrates a further example stopper comprising an ejection-resisting apparatus.

FIG. 2F illustrates a further example stopper 1306 comprising an ejection-resisting apparatus 1310. Stopper 1306 may be configured to operate similarly to stopper 25 of FIG. 2, stopper 191 of FIG. 2B, stopper 1006 of FIG. 2C, stopper 1106 of FIG. 2D, or any combination thereof. The location of components housed within stopper 1106 may be similar to locations of any of the stoppers described throughout this disclosure.

Stopper 1306 may comprise a lower portion 1308 including ejection-resisting apparatus 1310. Ejection-resisting apparatus 1310 may comprise one or more extension members, such as a first extension member 1314 and a second extension member 1316. The first extension member 1314 may extend from the lower portion 1308 at a first angle 1318 to the lower portion 1308 and the second extension member 1316 may extend from the lower portion 1308 at a second angle 1320 to the lower portion 1308. The first angle 1318 may be equal to the second angle 1320. In some examples, the first angle 1318 may be different from the second angle 1320. The first angle 1318 and the second angle 1320 may both be acute, both obtuse, or one of the first angle 1318 and the second angle 1320 may be acute and the other may be obtuse.

The ejection-resisting apparatus 1310 may be affixed to or extend from the lower portion 1308 at a mid-point 1322 of the lower portion 1308. In some examples, the ejection-resisting apparatus 1308 may be affixed to or extend from anywhere along the length of the stopper 1306, including the lower portion 1308. The ejection-resisting apparatus 1310 may be affixed to the lower portion 1308 by similar means to which the ejection-resisting apparatus 1110 is attached to the lower portion 1108 (FIG. 2D), such as by rigid attachment, a hinge mechanism, other attachment mechanisms, or any combination thereof.

The ejection-resisting apparatus 1310 may function similarly to the ejection-resisting apparatus 1110 (FIG. 2D), including resisting ejection of the stopper 1306 and/or having a line of sight, such as the line of sight 1204 (FIG. 2E), when partially removed from the container 1302. Further, the ejection-resisting apparatus 1310 may be flexible or may be configured to retract similar to the ejection-resisting apparatus 1110 (FIG. 2D).

Figure 3:
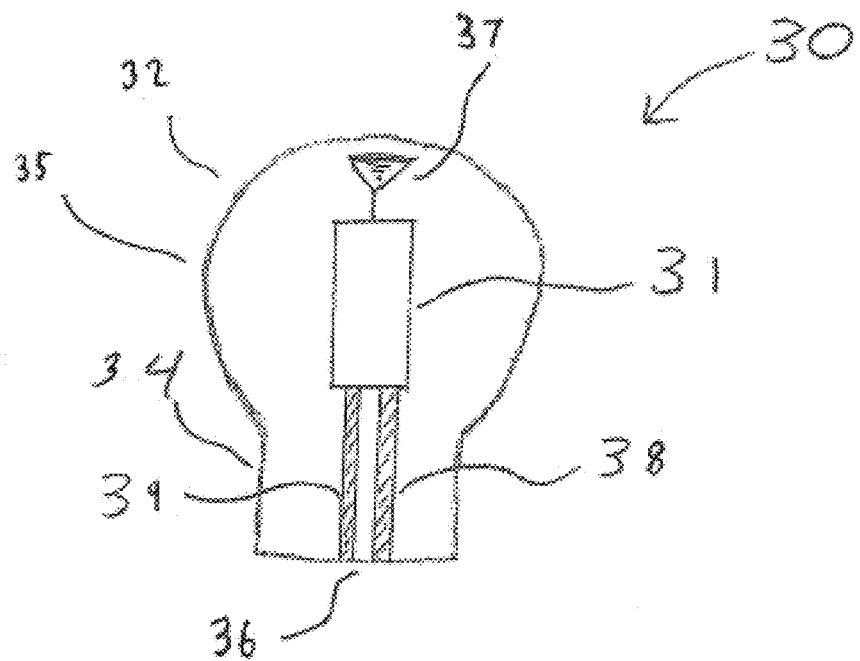
FIG. 3 illustrates a cross-sectional view of an example stopper, including an example liquid detection apparatus.

FIG. 3 illustrates a cross-sectional view of an example stopper 35, including an example liquid detection apparatus 30. Liquid detection apparatus 30 may be located inside of, embedded in, and/or otherwise inserted into stopper 35. Liquid detection apparatus 30 may comprise a processing device 31 configured to monitor, gauge, detect, measure, and/or identify a liquid. Liquid detection apparatus 30 may be communicatively coupled to one or more sensing devices, such as first sensing device 38 and second sensing device 39. Sensing devices 38 and 39 may be configured to perform measurements and processing device 31 may process data obtained from the measurements. In some examples, the measurements and processing of the data obtained from the measurements may occur in real-time. Lower ends of first sensing device 38 and second sensing device 39 may extend at or near lower surface 36 of stopper 35, wherein the lower ends may and/or may not be directly exposed to liquid or air surrounding stopper 35. In some examples, lower ends of first sensing device 38 and second sensing device 39 may extend at or near the edges of upper portion 32 and/or lower portion 34. Stopper 35 may comprise any combination of exposed sensing devices, non-exposed sensing devices, and/or sensing devices extending toward the edges of lower surface 36, lower portion 34, and/or upper portion 32.

One example of a sensing device may be configured to provide capacitance information to processing device 31, wherein the capacitance information may indicate the presence of liquid or air at an edge of stopper 35, such as at lower surface 36. In some examples, a higher capacitance received by processing device 31 may indicate the presence of liquid, and a lower capacitance received by processing device 31 may indicate the absence of liquid and/or the presence of air. In some examples, the capacitance information may be measured without direct contact of the sensing device(s) to the liquid or air surrounding stopper 35. In one example involving the fermentation of wine, a presence of air measured by the sensing device may indicate additional wine should be added to avoid oxidation or growth of acetobacter.

Another example of a sensing device may be configured to provide capacitance information indicating a level of a liquid in relation to the sensing device, a part of a container, such as container 2 (FIG. 1), a defined level, or any combination thereof. As the level of liquid changes in relation to the sensing device, the capacitance measured by the sensing device may increase or decrease in response. In one example, the level of liquid may be measured by the sensing device without use of moving mechanical parts, such as floats and/or magnets. In one example involving the fermentation of wine, a winemaker may want to maintain a certain level of wine within a barrel to avoid oxidation or growth of acetobacter.

Another example of a sensing device may be configured to detect whether stopper 35 has been ejected from a container, such as container 2 (FIG. 1), in which it was installed. Detection of whether stopper 35 has been ejected may comprise a means for determining an orientation of stopper 35, wherein being upright may be a usual orientation of stopper 35 when installed into the container and any other orientation may indicate that stopper 35 has been ejected from the container. In another example, detection of whether stopper 35 has been ejected may comprise a means for determining acceleration of stopper 35 after installation of stopper 35 within the container, such as container 2 (FIG. 1), wherein the existence of acceleration, movement, speed, and/or change in location may indicate that stopper 35 has been ejected from the container. A means for determining stopper 35 was ejected from the container may comprise an accelerometer attached to or installed within stopper 35. In other examples, a sensing device may comprise an electrical contact that is configured to detect the surrounding material within the opening of the container that stopper 35 is installed. A change in resistance, impedance, or other electrical characteristic of the electrical contact may similarly be used to determine that stopper 35 has been ejected. In still other examples, stopper 35 may comprise a sensing device comprising a liquid switch. The liquid switch may be activated/deactivated according to an orientation of stopper 35, such as when a liquid within an internal reservoir of stopper 35 is allowed to form an electrical connection between two contacts located at opposite ends of the reservoir (e.g., when stopper 35 is ejected and resting on its side).

In some examples, the stopper 35 may comprise a means for locating the stopper 35 within a winery in response to the sensing device detecting that the stopper 35 was ejected. A location of the stopper 35 may be determined through use of GPS, wireless, magnetic, near-field, radio, radio frequencies, radio frequency identification, other ways known for determining a position of an object, or any combination thereof. Sensors for determining the location of an ejected stopper may be placed throughout the winery or may be placed on racks supporting wine barrels. In some examples, stopper 35 may determine which sensor is closest to the stopper and transmit a signal including a sensor identifier, such that it may be determined which rack or portion of the winery in which the stopper 35 is located. The stopper 35 may also be equipped with components for drawing attention to the ejected stopper, including but not limited to lights that flash once the stopper is ejected, speakers for emitting audible noise once the stopper is ejected, a communication device for transmitting a signal, or any combination thereof.

Another example of a sensing device may be configured to detect a pH level of liquid within a container, such as container 2 (FIG. 1). A pH level sensing device may be configured such that the sensing device may or may not be directly exposed to liquid within the container. In an example involving fermentation of wine, pH may aid in the selection of a type and amount of yeast to be added to the container. Further, in an example involving fermentation of wine, pH may indicate when the process of converting malic acid to lactic acid within the wine has completed.

Another example of a sensing device may be configured to detect temperature. The sensing device may be used for obtaining temperature of a liquid within a container, such as container 2 (FIG. 1), temperature of air within the container, temperature of the container itself, temperature of the environment surrounding the container, or any combination thereof. In some examples, temperature of a liquid within the container may be measured without the sensing device coming into direct contact with the liquid. A temperature sensing device may be used in combination with a pH level sensing device, such that the pH level is compensated for the sensed temperature. In one example involving wooden barrels for fermenting wine, temperature may affect evaporation of the wine, such that a winemaker may desire to maintain a certain temperature. In another example involving fermenting wine, a winemaker may desire to maintain a temperature between a higher level of temperature and a lower level of temperature to avoid production of hydrogen sulfide by yeast used during the fermenting process.

Another example of a sensing device may be configured to detect a Brix level, or another measure of sugar or sugar concentration, of a liquid within a container, such as container 2 (FIG. 1). A Brix level sensing device may be configured such that the sensing device is exposed to liquid within the container. In one example involving fermenting wine, a Brix level may be used to determine the type or amount of yeast to add to the wine and/or the Brix level may be used to determine the alcohol content of the wine.

Another example of a sensing device may be configured to detect a level of hydrogen sulfide within a container, such as container 2 (FIG. 1). A hydrogen sulfide sensing device may be configured such that the sensing device is exposed to air within the container. In one example involving fermenting wine, the level of hydrogen sulfide may indicate that yeast is being stressed, such as by lack of oxygen and/or improper temperature levels. Further, in the example involving fermenting wine, a non-zero level of hydrogen sulfide may result in the wine developing mercaptans or dimercaptans. If a non-zero level of hydrogen sulfide is timely detected, copper sulfate may be added to the wine to correct the issue or the wine may be racked off the yeast leaves to correct the issue.

Another example of a sensing device may be configured to detect turbidity and/or color of a liquid within a container, such as container 2 (FIG. 1). A sensing device for detecting turbidity and/or color may comprise a spectrometer, spectroscope, spectrophotometer, or any other device that may be used to determine the turbidity and/or color of a liquid. In some examples, turbidity and/or color may be measured without direct contact of the sensing device with a liquid within the container. For example, the sensing device may be sealed within stopper 35 and/or placed behind a glass or clear plastic cover located at a surface of stopper 35. In one example involving fermenting wine, low turbidity may indicate that the process of converting malic acid to lactic acid has completed. Further, in the example involving fermenting wine, low turbidity may indicate a lack of bacteria and/or yeast during a process when one or both should be present.

Another example of a sensing device may be configured to detect a level of carbon dioxide within a container, such as container 2 (FIG. 1). A carbon dioxide sensing device may be exposed to air within the container. In one example involving fermenting wine, a lack of production of carbon dioxide may indicate the process of converting malic acid to lactic acid has completed. Further in the example involving fermenting wine, lack of carbon dioxide production may indicate that chemicals may need to be added to the container to protect against oxidation and/or development of acetobacter.

Stopper 35 may comprise one or more of the sensing devices described above. Further, stopper 35 may receive data from one or more sensing devices located within stopper 35, located on the outside of stopper 35, located within a container, located on the container, located outside of the container, or any combination of locations thereof. In some examples, stopper 35 may receive data from the one or more sensing devices wirelessly.

Stopper 35 may comprise a plurality of one or more of the sensing devices described above located in different locations within stopper 35 for the purpose of measuring different values. For instance, in some examples stopper 35 may comprise a first temperature sensing device for measuring the ambient temperature outside of a container, such as container 2, in which stopper 35 is installed and a second temperature sensing device for measuring the temperature inside of the container. The first temperature sensing device may be located at a top of stopper 35 and the second temperature sensing device may be located at a bottom of stopper 35. The measured values may be compared to determine if issues exist with a liquid inside the container. For example, if the ambient temperature outside of the container and the temperature inside the container vary, it may be an indication that acetobacter is developing within the container.

Stopper 35 may comprise sensing devices exposed to liquid and/or air, sensing devices that are sealed within stopper 35 to avoid direct contact with the liquid and/or air, or any combination thereof. In some examples, lack of non-zero readings from all sensing devices may indicate an issue, such as stopper 35 may have been ejected from the container, and an alert may be generated.

Stopper 35 may be configured to continuously monitor the one or more sensing devices, thereby receiving real-time data. Alternatively, in some examples energy efficiency may be achieved by stopper 35 monitoring the one or more sensing devices at preset intervals. Additionally, stopper 35 may be configured to continuously monitor some of the sensing devices that benefit from constant monitoring, while monitoring other sensing devices at preset intervals for energy efficiency.

Liquid detection apparatus 30 may comprise a processing device 31. Processing device 31 may be communicatively coupled to one or more sensing devices, such as first sensing device 39 and second sensing device 38. Processing device 31 may receive data in real-time from the one or more sensing devices and may process the data of each sensing device separately and/or in combination. Processing device 31 may process the data in real-time, or substantially real-time. In some examples, processing device 31 may contain a pre-determined range of acceptable measurements for a measurement produced by a sensing device, wherein the pre-determined range may be associated with a type, shape, size, or any combination thereof, of container. Alternatively, a user may input a range of acceptable measurements for a measurement produced by a sensing device.

Processing device 31 may comprise memory for storage of information. Information stored may non-exhaustively comprise data received from one or more sensing devices communicatively coupled to the processing device 31, identification information of a stopper, identification information for a container in which the stopper is inserted, an age of the container, a type of liquid within the container, a type of the container, how long the liquid has been in the container, a location of the container, or any combination thereof.

Liquid detection apparatus 30 may further comprise a communication device 37 communicatively coupled to processing device 31. Communication device 37 may operate using Bluetooth, wireless, magnetic, Wi-Fi, near-field, radio, radio frequencies, radio frequency identification (RFID), other types of communication systems/protocols, or any combination thereof. Communication device 37 may transmit, broadcast, or otherwise communicate information associated with a container and liquid within the container in real-time. Alternatively, communication device 37 may transmit, broadcast, or otherwise communicate the information at selected intervals, such as once a day. In some examples, one or both of processing device 31 and communication device 37 may be at least partially located within upper portion 32 of stopper 35.

Figure 4:
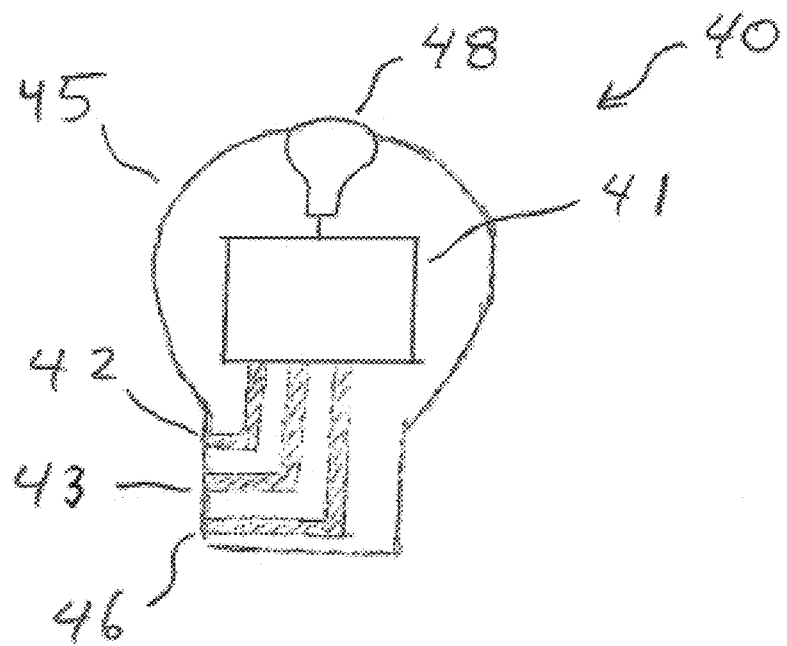
FIG. 4 illustrates a cross-sectional view of a further example stopper, including an example liquid detection apparatus.

FIG. 4 illustrates a further example of a liquid detection apparatus 40, comprising a processing device 41 and a signal 48. Signal 48 may comprise one or more visible and/or audible alerts that may be configured to indicate a state associated with a stopper, a container, a liquid within the container, or any combination thereof, wherein state may be determined by measurements returned from sensing devices, such as sensing device 38 (FIG. 3) or sensing device 39 (FIG. 3). In some examples, signal 48 may comprise one or more light emitting diodes (LEDs) that are visible at or through an exterior surface of stopper 45. Signal 48 may be configured to produce varying outputs depending on the state of stopper 45 and/or the information obtained from sensing devices. In some examples, the signal 48 may output different audible tones and/or audible speech to indicate whether a container requires attention. In some examples, the signal 48 may comprise LEDs configured to display different colors and/or perform different output sequences, such as flashing on and off or alternating between different colors, to indicate the state of stopper 45, a container, and/or a liquid within a container.

Signal 48 may be configured to indicate low battery, a container does not require attention, a container requires non-immediate attention, and/or a container requires immediate attention. Further, signal 48 may be configured to provide an indication for why a container requires attention, such as to add liquid to the container, sensing devices measuring values outside allowable range for respective measurements, ejection of stopper 45, other issues that may cause a container to require attention, or any combination thereof.

Processing device 41 may be communicatively coupled to one or more sensing devices, such as a first sensing device 42, a second sensing device 43, and a third sensing device 46. The sensing devices may comprise one or a combination of the examples of sensing devices discussed in the disclosure referring to FIG. 3. In one example, first sensing device 42, second sensing device 43, and third sensing device 46 may be similar in operation to that described with respect to sensing device 38 and sensing device 39 of FIG. 3. A lower end of first sensing device 42 is shown at a first position and the lower end of third sensing device 46 is shown at a lower position. A lower end of second sensing device 43 is shown at an intermediate position, vertically positioned between the lower end of first sensing device 42 and a lower end of third sensing device 46.

In some examples where first sensing device 42, second sensing device 43, and third sensing device 46 comprise capacitive sensing devices configured to determine a presence of liquid, signal 48 may be configured to provide varying indications depending on a level of a liquid, such as: when the presence of liquid is measured at all the sensing devices, signal 48 may indicate that attention is not required; when the presence of liquid is measured at only the second sensing device 43 and the third sensing device 46, signal 48 may indicate that non-immediate attention is required; and when the presence of liquid is measured at only the third sensing device 46, signal 48 may indicate that immediate attention is required.

In some examples, in response to detecting liquid at the lower end of first sensing device 42, signal 48 may remain lit, flash at a first rate, display a green light, or any combination thereof. In response to detecting air at the lower end of first sensing device 42 and liquid at the lower end of second sensing device 43, signal 48 may flash at a second rate, display a yellow light, or any combination thereof. Similarly, in response to detecting air at the lower end of second sensing device 43 and liquid at the lower end of third sensing device 46, signal 48 may flash at a third rate, display a red light, or any combination thereof. In some examples, a red light and/or a flashing light may indicate that none of the sensing devices 42, 43, or 46 detect the presence of liquid, which may indicate that the level of the liquid is below stopper 45.

In some examples, signal 48 may be configured to display different colors or flash at different rates when a condition occurs, including but not limited to when a level of a liquid is outside a desired range, a temperature inside a barrel is outside a desired range, stopper 45 has been ejected, or any combination thereof.

Figure 5:
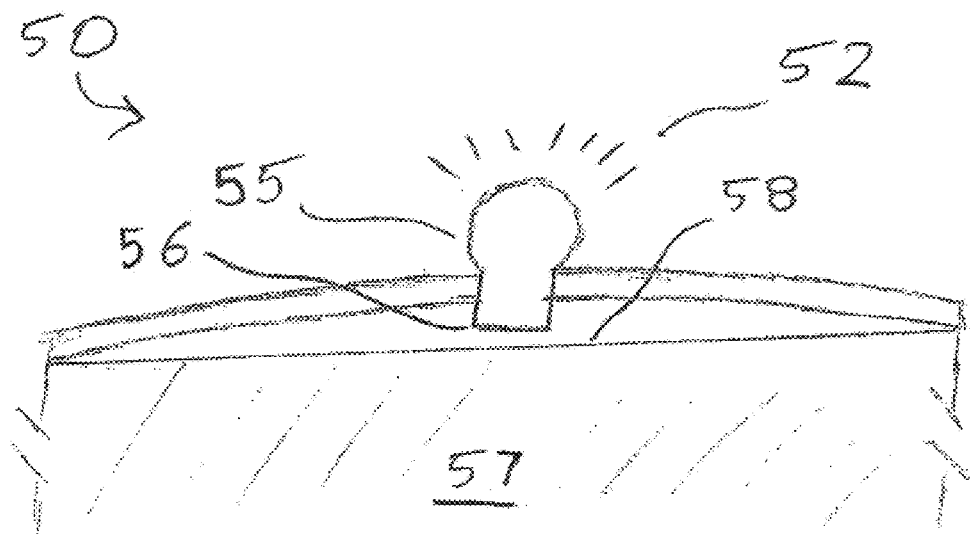
FIG. 5 illustrates an example liquid detection system comprising a remote monitoring device.
Figure 5:
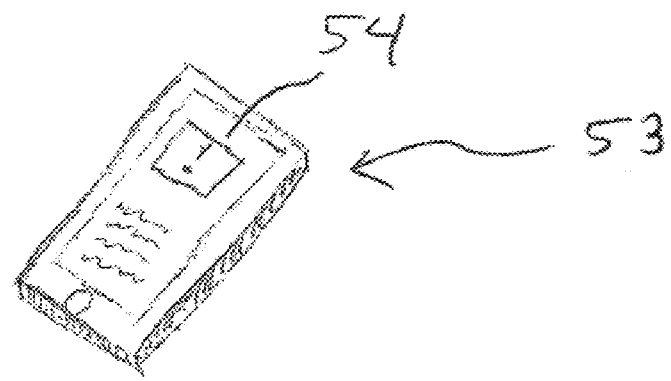

FIG. 5 illustrates an example liquid detection system 50 comprising a remote monitoring device 53. Stopper 55 is shown inserted into barrel 58 including liquid 57. An upper surface of liquid 57 is shown located below lower surface 56 of stopper 55, although the upper surface of liquid 57 may be located above or at lower surface 56 of stopper 55. Stopper 55 may be configured to transmit, broadcast, or otherwise communicate diagnostic information 52 associated with the state of stopper 55 and/or input from sensing devices communicatively coupled to stopper 55.

Remote monitoring device 53 may be configured to wirelessly transmit commands or data to, or wirelessly receive, retrieve, and/or otherwise obtain diagnostic information 52 from, stopper 55 in real-time, using one or more of the systems and/or protocols, such as Bluetooth, wireless, magnetic, Wi-Fi, near-field, radio, radio frequencies, RFID, or any combination thereof. In some examples, remote monitoring device 53 may be configured to communicate with stopper 55 in substantially real-time, such as when delay is caused by remote monitoring device 53 being outside of a proximity to communicate with stopper 55. In some examples, the remote monitoring device 53 may be configured to communicate with stopper 55 through use of one or more repeaters, such as repeater 117 of FIG. 10 or repeater 146 of FIG. 13, the one or more repeaters including, but not limited to, Bluetooth repeaters, Wi-Fi repeaters, radio repeaters, radio frequency repeaters, RFID repeaters, wireless repeaters, or any combination thereof. The repeaters may be configured to permit communication within a structure, such as a winery, or may permit communication between structures or over long distances. In some examples, the repeaters may be configured to limit communication to a specified area, such as a structure, for security purposes and/or preventing unintended dissemination of the communication.

Remote monitoring device 53 may obtain, record, monitor, compare, store, and/or otherwise process diagnostic information 52 from a plurality of containers, such as container 2 (FIG. 1). In some examples, remote monitoring device 53 may be configured to store diagnostic information 52 for a plurality of containers in a database internal and/or external to the remote monitoring device 53. Diagnostic information 52 may include, but is not limited to, requests for maintenance of a container, information obtained by one or more sensing devices, low battery level indicators of a plurality of stoppers, identification information of a stopper and/or container, location information of a stopper and/or container, indication that a stopper has been ejected from a container, or any combination thereof. Additionally, diagnostic information 52 may be used to monitor the performance of the plurality of containers in order to determine when one or more of the containers needs to be serviced and/or replaced due to unacceptable characteristics, such as a high rate of loss of liquid.

In some examples, remote monitoring device 53 may be configured such that when the remote monitoring device 53 is within a proximity of a container, the remote monitoring device 53 may automatically access stored and/or real-time diagnostic information 52 for the container, and display the corresponding diagnostic information 52 on the remote monitoring device 53. In some examples, remote monitoring device 53 may be configured to display an alert 54 when the remote monitoring device 53 is within a proximity of a container which requires attention and may display diagnostic information 52 associated with the container, such as information identifying the container, on the remote monitoring device 53. In some examples, remote monitoring device 53 may be configured to receive an alert signal when the container requires attention and may display an alert 54, location information associated with the container, and/or diagnostic information 52 associated with the container on the remote monitoring device 53, regardless of the proximity of the remote monitoring device to a container.

Diagnostic information 52 associated with each individual stopper may comprise unique identification information. The unique identification information may comprise a serial number, an RFID code, a barcode, a lot number, a container number, a section number, a physical location of a container, a physical location of a stopper, a rack location (which may include a rack number and rack level), or any combination thereof. In some examples, remote monitoring device 53 may be configured to read RFID codes and/or barcodes off of a section marker, lot marker, rack, container, and/or stopper and access diagnostic information 52 associated with the RFID code and/or barcode. In some examples, a user may input unique identification information into remote monitoring device 53 and access diagnostic information 52 associated with the unique identification information.

In some examples, remote monitoring device 53 may be configured to provide data to a server, such as a cloud server, or a repeater. The remote monitoring device 53 may be configured to read a barcode off of a component, such as stopper 55, barrel 58, a wine rack, a location within a winery, other definable locations, or any combination thereof, and associate the component with another component. The remote monitoring device 53 may be configured to provide the association data to the server or the repeater, such that the server or repeater may identify a location of the components within a winery. An example process may comprise entering an association mode on remote monitoring device 53, scanning a first barcode located on stopper 55, scanning a second barcode located on barrel 58, associating, by the remote monitoring device 53, stopper 55 with barrel 58, and transmitting the association data to a server or a repeater that identifies a location of stopper 55 or barrel 58 based at least in part on the association data.

The remote monitoring device 53 may further be configured to locate a stopper, such as the stopper 55. In some examples, locating the stopper may be useful for when a stopper is misplaced, lost, or ejected from a container. A user may initiate a stopper locator process on the remote monitoring device 53, causing the remote monitoring device 53 to request a location identifier from a desired component, such as a particular stopper, a plurality of stoppers, a barrel, a rack, or any combination thereof. The remote monitoring device 53 may be configured to transmit the request and receive a response Bluetooth, wireless, magnetic, Wi-Fi, near-field, radio, radio frequencies, radio frequency identification (RFID), other types of communication systems/protocols, or any combination thereof. The desired component may respond with the location identifier identifying where the desired component is, other components to which the desired component is near, a sensor to which the desired component is near, or any combination thereof.

The remote monitoring device 53 may utilize sensors or other communication device located on barrels or racks, throughout the winery, or any combination thereof, for locating the desired component. The desired component may be configured to identify the nearest sensor and transmit the location identifier to the remote monitoring device 53 indicating it is near the sensor. Further, the desired component may be configured to perform actions to draw attention to it. For example, the stopper 55 may be configured to make noise, flash lights, transmit a signal indicating its location, or any combination thereof to draw attention to the stopper 55 in response to the stopper locator process of the remote monitoring device 53 being initiated.

In some examples, the remote monitoring device 53 may provide a map or directions to the desired component during the stopper locator process. In some examples, the remote monitoring device 53 may be within a certain proximity of the desired component for the map or directions to appear on the remote monitoring device 53. Further, the remote monitoring device 53 may be within the certain proximity of the desired component to initiate the desired component to perform the actions to draw attention to it.

In some examples, remote monitoring device 53 may be used for determining when an activity, such as topping off of a barrel, is performed. Further, the remote monitoring device 53 may transmit data to a server or repeater that indicates when calculations or monitoring of a certain value should begin. For example, remote monitoring device 53 may be configured to enter a refill mode when a barrel is being topped off. After the barrel is topped off, the remote monitoring device 53 may scan a barcode on stopper 55 or barrel 58 and transmit data to a server or repeater indicating that the system should start or restart tracking the liquid level within barrel 58 at the time that the scan occurred.

Remote monitoring device 53 may comprise a computing device, such as a tablet, a laptop, a smart phone, a personal digital assistant (PDA), an RFID reader, a scanner, other types of hand-held user devices, or any combination thereof. Remote monitoring device 53 may be configured to communicate with processing device 31 (FIG. 3) and/or processing device 41 (FIG. 4). In some examples, remote monitoring device 53 may be configured to perform some or all of the operations described above with respect to processing device 31 and/or processing device 41.

Whereas various examples describe a liquid detection apparatus located at least partially within a stopper, other liquid detection systems may comprise sensing devices located on the exterior of, attached to, or located near a stopper, without necessarily being located within the stopper. One or more of the apparatus and systems described herein may be used with any conventional type of container, including wine barrels. Additionally, stopper 55 may comprise a plurality of different sizes, including but not limited to the size of a conventional stopper or bung, and may be interchangeably used in one or more containers, such as container 2 (FIG. 1).

Stopper 55 may be configured to identify a container in which stopper 55 is inserted, including but not limited to a Bordeaux-shaped wine barrel, a burgundy-shaped wine barrel, a whiskey-shaped wine barrel, a hogshead wine barrel, a plastic or stainless steel barrel, and/or a puncheon wine barrel. In some examples, stopper 55 may receive information identifying a container in which stopper 55 is inserted. An acceptable range for a sensing device measurement may be associated with the type of container in which stopper 55 is inserted and an alert may be generated and/or the state of signal 48 (FIG. 4) may respond to measurements of the sensing device outside the acceptable range. For example, a liquid measurement associated with a barrel having a relatively large exterior axial curvature may be acceptable as compared to the same liquid measurement associated with a barrel having a relatively flat exterior axial profile. The amount of axial curvature of the barrel may determine a different amount of surface area of the liquid that is exposed to air, and thus provide a different level of risk associated with the development of non-beneficial bacteria at the surface of the liquid.

Figure 6:
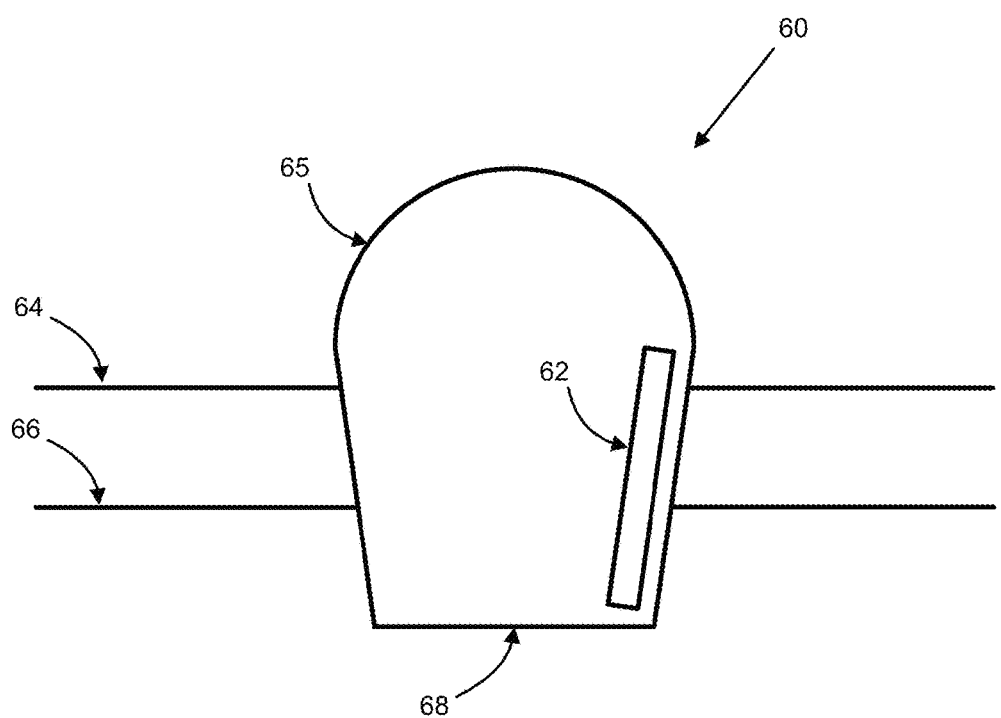
FIG. 6 illustrates a cross-sectional view of an example liquid detection apparatus.

FIG. 6 illustrates a cross-sectional view of an example liquid detection apparatus 60, comprising a stopper 65 and a printed circuit board 62. In some examples, stopper 65 may be solid. Printed circuit board 62 may be installed within stopper 65, mounted on the outside of stopper 65, or mounted onto a container, such as container 2 (FIG. 1). Printed circuit board 62 may be exposed to air, exposed to liquid, enclosed within stopper 65 such that it is not exposed to air or liquid, or any combination thereof. Stopper 65 is shown inserted into a container at a container depth 64. The container may include liquid, such as liquid 57 (FIG. 5). A surface level 66 of the liquid is shown located above a lower surface 68 of stopper 65 and below container depth 64.

Printed circuit board 62 may comprise one or more of the sensing devices described in the disclosure referring to FIG. 3. The one or more sensing devices may be located in different locations on the printed circuit board 62 to achieve different purposes. For instance, a first temperature sensing device may be located at the top of the printed circuit board 62 to measure ambient temperature and a second temperature sensing device may be located at the bottom of the printed circuit board 62 to measure the temperature inside a container into which stopper 65 is installed. In some examples, printed circuit board 62 may comprise a processing device, such as processing device 31 or processing device 41, a signal, such as signal 48, a communication device, such as communication device 37, or any combination thereof.

Figure 7:
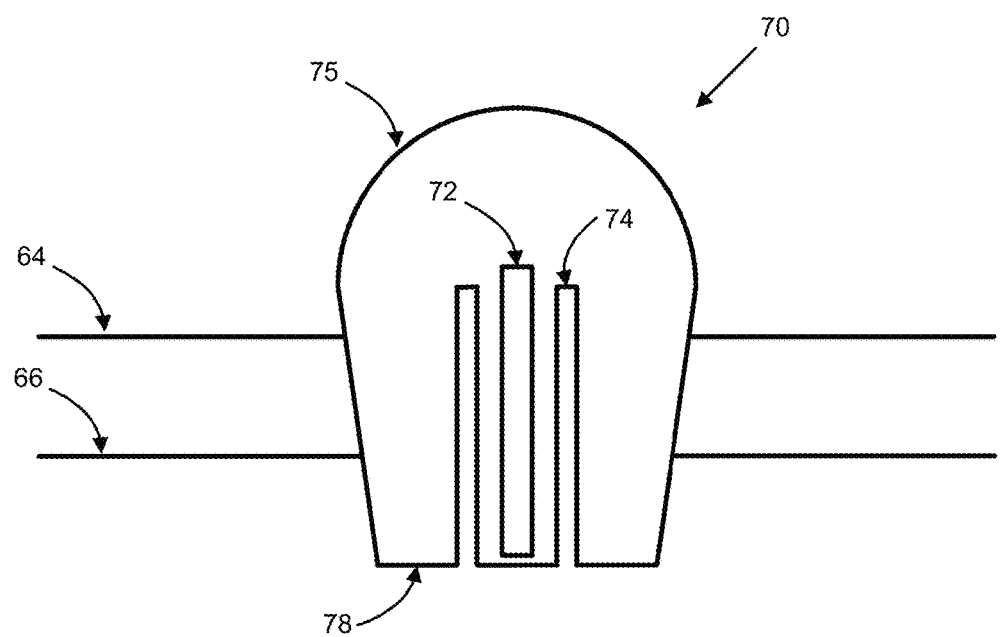
FIG. 7 illustrates a cross-sectional view of a further example of a liquid detection apparatus.

FIG. 7 illustrates a cross-sectional view of a further example of a liquid detection apparatus 70, comprising a stopper 75 and a printed circuit board 72. Stopper 75 may comprise one or more hollow spaces 74. The one or more hollow spaces 74 may extend into stopper 75 from any surface of stopper 75, such as lower surface 78, allowing the liquid to enter stopper 75. Printed circuit board 72 may be partially or completely surrounded by one or more hollow spaces 74. In some examples, the one or more hollow spaces 74 may be configured such that liquid and/or air that reside within the hollow spaces may contact at least part of the printed circuit board 72. Alternatively in other examples, the one or more hollow spaces 74 are configured such that liquid and/or air that reside within the hollow spaces may partially or completely surround the printed circuit board 72 without contacting the printed circuit board 72.

Figure 8A:
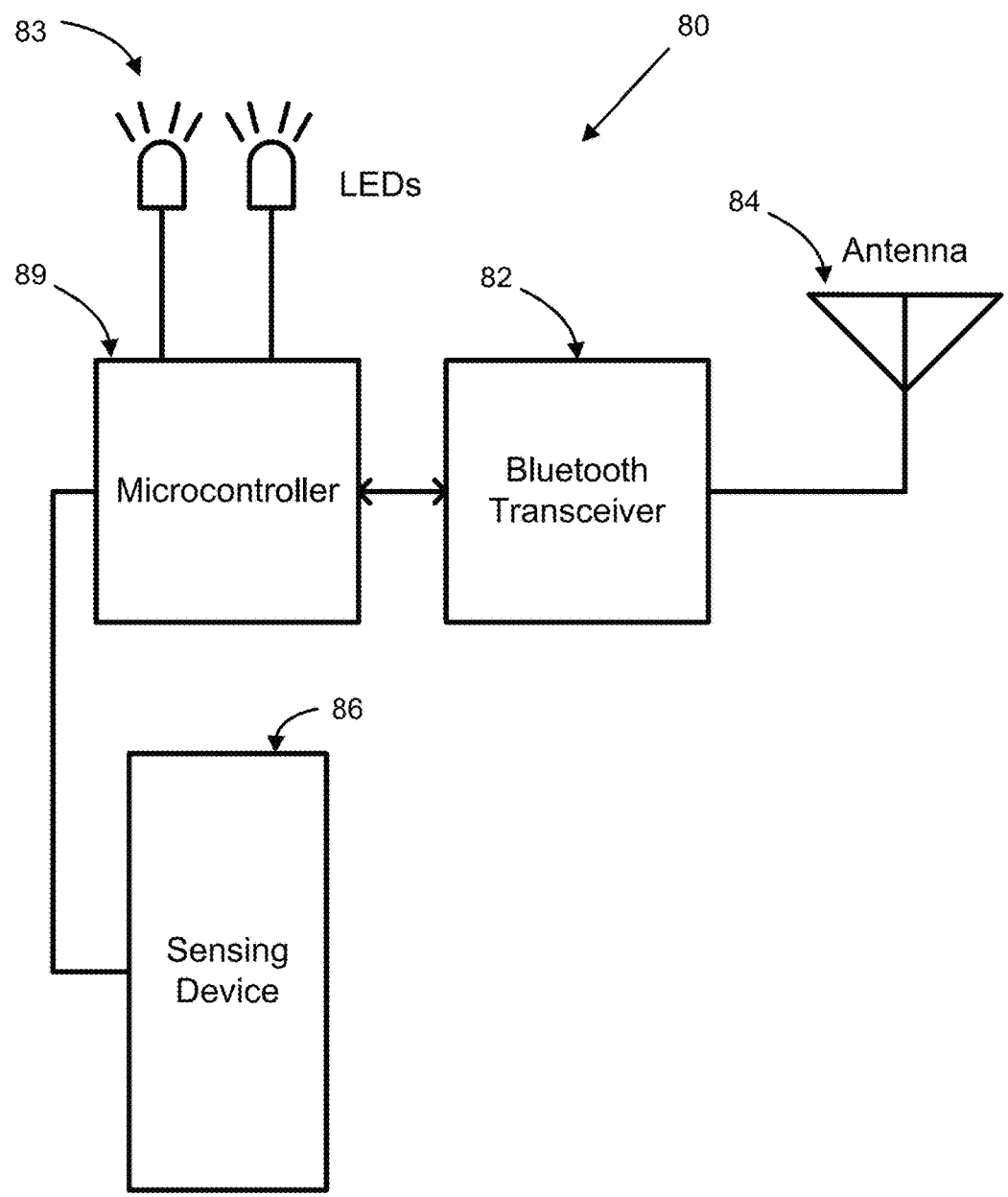
FIG. 8A illustrates a block diagram of an example of a liquid detection apparatus.

FIG. 8A illustrates a block diagram of an example of a liquid detection apparatus 80. Liquid detection apparatus 80 may comprise a microcontroller 89, a Bluetooth transceiver 82, an antenna 84, a signal device 83, and a sensing device 86. In some examples, one or more of microcontroller 89, Bluetooth transceiver 82, antenna 84, signal device 83, and sensing device 86 may comprise a printed circuit board, such as printed circuit board 62 (FIG. 6) or printed circuit board 72 (FIG. 7).

Figure 8B:
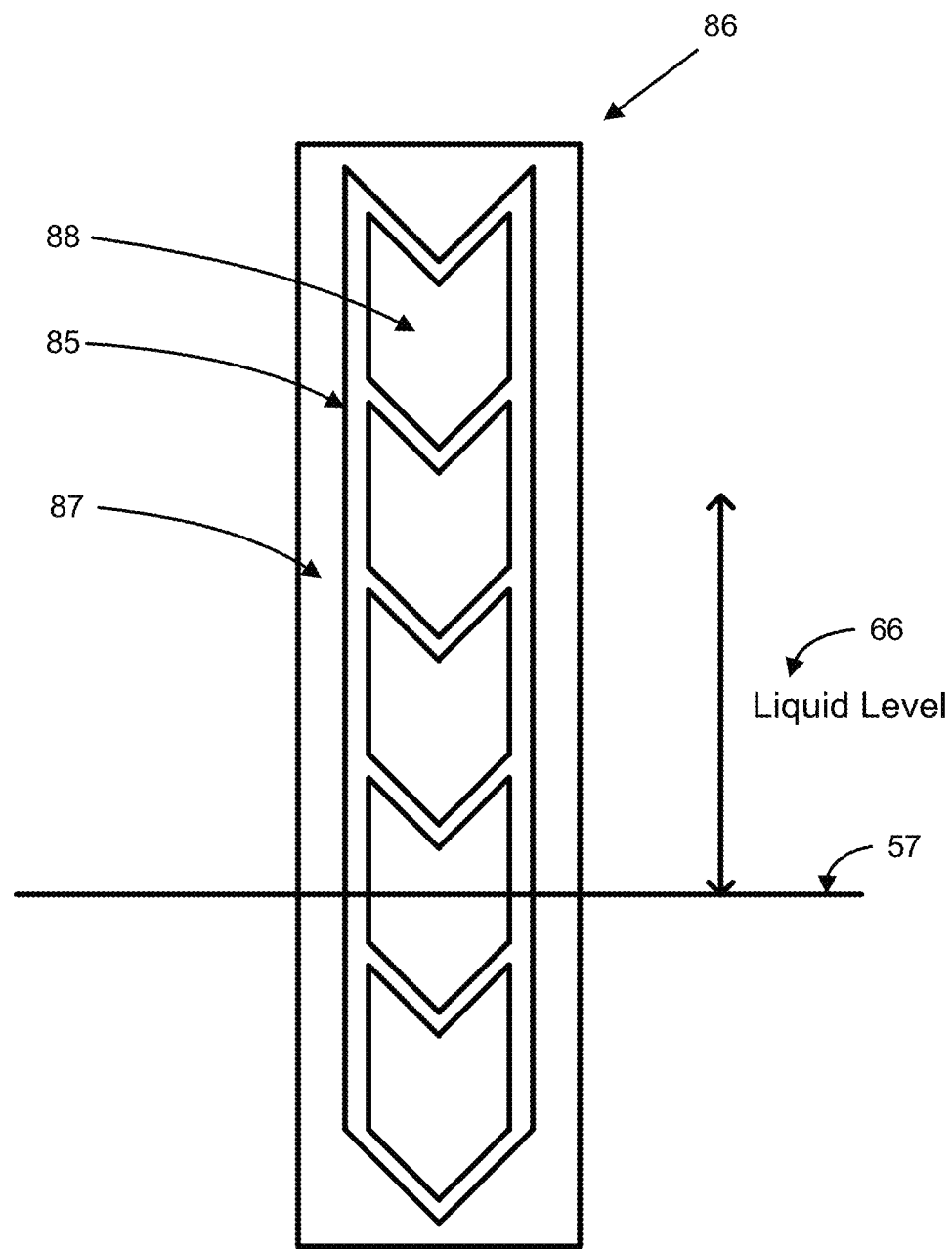
FIG. 8B illustrates an example sensing device.

FIG. 8B illustrates an example sensing device. The sensing device 86 may comprise one or more capacitive sensing electrodes 88 separated by a neutral layer 85. The capacitive sensing electrodes 88 may be chevron shaped. The neutral layer 85 may be surrounded by a ground layer 87. In some examples, sensing device 86 may be exposed to liquid 57. Alternatively, sensing device 86 may be isolated from liquid 57, such that sensing device 86 may not be exposed to liquid 57. Capacitive sensing electrodes 88 may be configured such that each sensing electrode 88 discretely determines whether liquid 57 makes contact and/or is present at the same physical level as the respective sensing electrode 88. Alternatively, capacitive sensing electrodes 88 may be configured such that a first measured capacitance of an electrode coincides to a first liquid level relative to the electrode, and a second measured capacitance of the electrode coincides to a second liquid level relative to the electrode, such that sensing device 86 outputs an analog measurement of liquid level 66.

In examples including a communication device 37 (FIG. 3), the communication device 37 may comprise a Bluetooth transceiver 82. Communication device 37 may be communicatively coupled to the processing device 31 (FIG. 3), which may comprise microcontroller 89. Communication device 37 also may be communicatively coupled to an internal and/or external antenna 84. Communication device 37 may be configured to transmit at a plurality of different frequencies. Communication device 37 may also be configured to transmit diagnostic information 52 (FIG. 5) to a computing device, such as remote monitoring device 53 (FIG. 5).

In some examples, signal device 83 may comprise one or more LEDs. The LEDs may comprise multiple colored LEDs, each color having different significance. One color may signify that the liquid level 66 of the liquid 57 is at an acceptable level, while another color may signify that the liquid level 66 of the liquid 57 requires attention. In some examples, the LEDs may be configured to flash to signify that attention is required.

Figure 9:
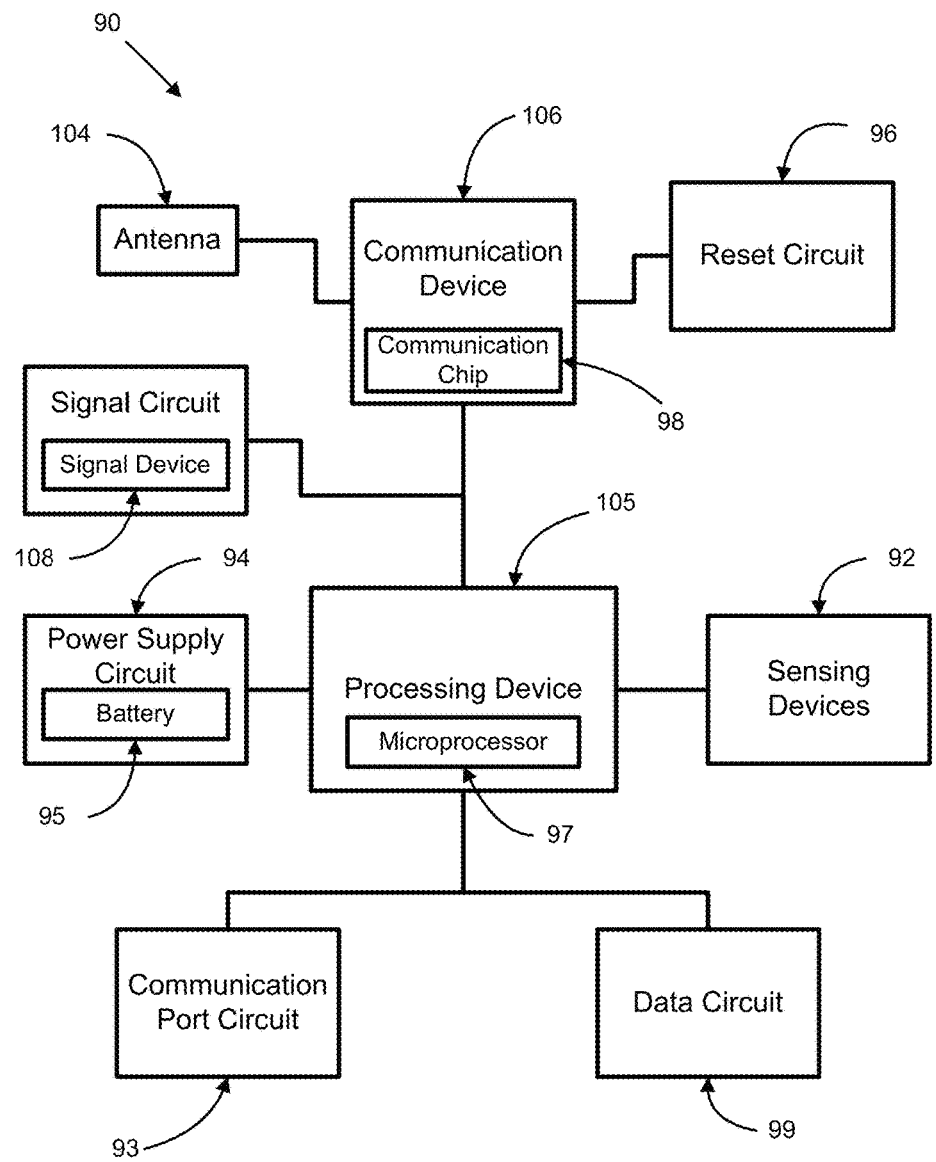
FIG. 9 illustrates a block diagram representation of an example liquid detection apparatus.

FIG. 9 illustrates a block diagram representation of an example liquid detection apparatus. Liquid detection apparatus 90 may comprise a processing device 105, a communication device 106, a signal device 108, sensing devices 92, or any combination thereof. The liquid detection apparatus 90 may further comprise a power supply circuit 94 and/or a reset circuit 96.

Processing device 105 may comprise a microprocessor 97. Microprocessor 97 may have inputs connected to sensing devices 92. In some examples, microprocessor 97 may have outputs connected to a signal circuit 91, communication device 106, a communication port circuit 93, and/or a data circuit 99. Microprocessor 97 may be configured to interpret the input from sensing devices 92 and output diagnostic information to the communication device 106. Microprocessor 97 may also be configured to activate and control the signal circuit 91 based on input from the sensing devices 92. Microprocessor 97 may also be programmed using the communication port circuit 93. Microprocessor 97 may be connected to power supply circuit 94 to provide power to the microprocessor 97.

Communication device 106 may comprise a communication chip 98. Communication chip 98 may have inputs from processing device 105, process the input data, and output the processed data to an antenna 104. The communication chip 98 may be connected to a reset circuit 96 allowing the communication chip 98 and/or the liquid detection apparatus 90 to be reset when necessary. Reset circuit 96 may be triggered either physically or electronically and may comprise any devices that can be triggered physically or electronically.

Power supply circuit 94 may comprise a battery 95 to supply power. Battery 95 may be completely encased within liquid detection apparatus 90. In some examples, battery 95 may be enclosed in a portion of the liquid detection apparatus 90 that is sealed from the external environment, thereby preventing damage that may occur from such occurrences as liquid coming in contact with battery 95 or electrical components within liquid detection apparatus 90.

In some examples, battery 95 may be configured to last longer than the useful life of the liquid detection apparatus 90 such that replacement of the battery 95 is not required prior to exhaustion of the useful life of the liquid detection apparatus 90. For example, the rubber comprising a stopper may wear down to a point where the stopper is no longer useable prior to the battery life of battery 95 being exhausted.

In some examples, battery 95 may comprise a rechargeable battery. Battery 95 may be recharged by connecting liquid detection apparatus 90 to a power source or by placing liquid detection apparatus 90 within proximity of a recharging source. Multiple liquid detection apparatuses, such as liquid detection apparatus 90, may be placed within proximity of a recharging source or within a container operating as a recharging source to be recharged. For example, multiple liquid detection apparatuses may be placed within a container, wherein the batteries of the multiple liquid detection apparatuses are charged concurrently.

The power supply circuit 94 may comprise any other power supply source, including alternating current or direct current sources, such as batteries, electrical outlets, other power sources, or any combination thereof. The power supply circuit 98 may also be configured to transform an alternating current source into a direct current output.

Signal circuit 91 and/or signal device 48 (FIG. 4) may comprise one or more LEDs, incandescent lights, speakers, other visual or audio signal producing devices, or any combination thereof. Signal circuit 91 and/or signal device 48 may be configured to display different colors or flash at different rates when a condition occurs, including but not limited to when a level of a liquid is outside a desired range, a temperature inside a barrel is outside a desired range, a stopper has been ejected, or any combination thereof. In some examples, signal circuit 91 and/or signal device 48 may be configured to activate when a temperature inside a barrel is greater than 85 degrees Fahrenheit or less than 60 degrees Fahrenheit.

Floating Liquid Detection Apparatus

Figure 10:
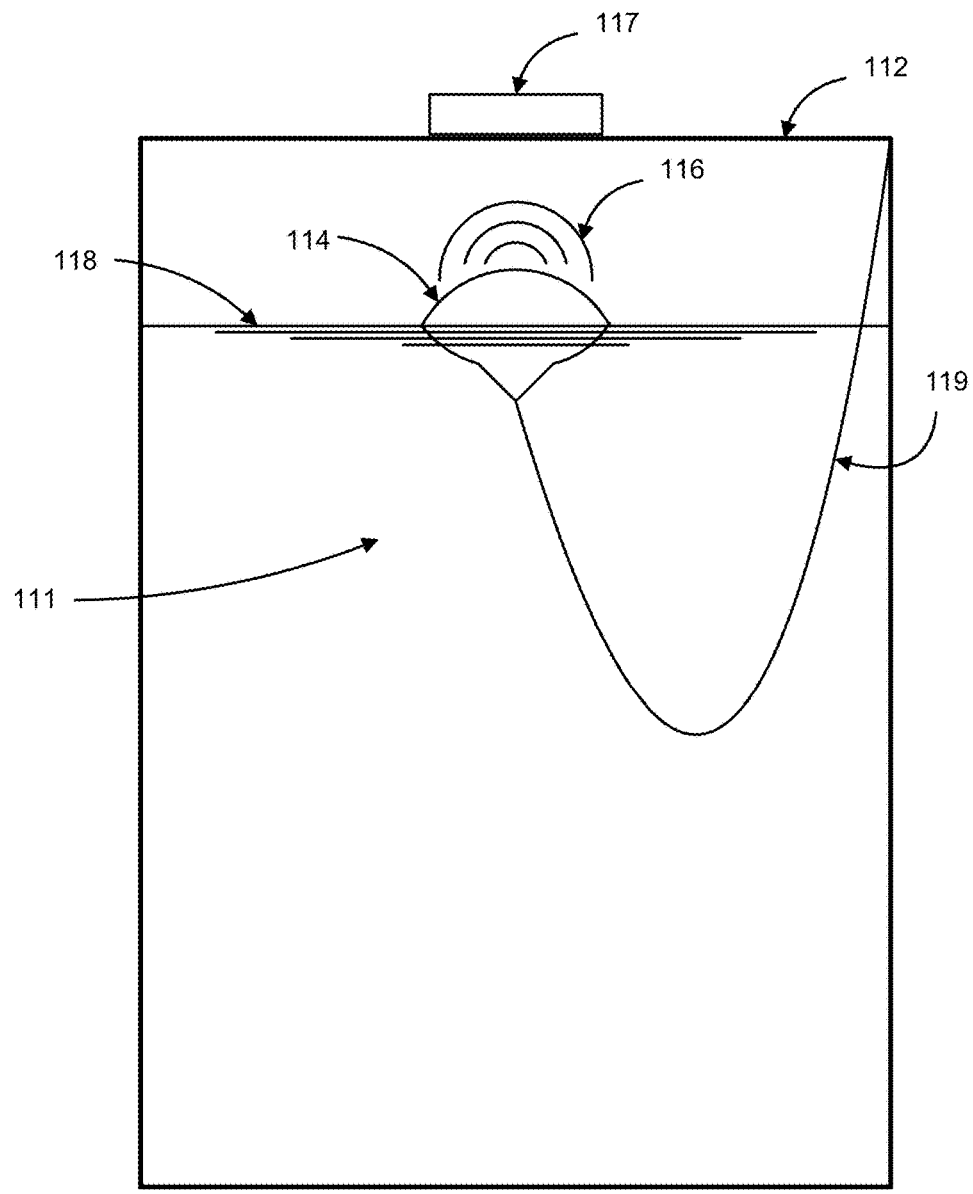
FIG. 10 illustrates a cross-sectional view of a container including an example floating liquid detection apparatus with tether.

FIG. 10 illustrates a cross-sectional view of a container 112 including an example floating liquid detection apparatus 114 with tether 119. The floating liquid detection apparatus 114 may comprise all, or a combination of one or more of the features of the examples of mounted liquid detection apparatuses described above. Container 112 may comprise a container of any size or any composition. In one example, container 112 may comprise a stainless steel tank containing wine. In another example, the container 112 may be fuel tank containing fuel.

A floating liquid detection apparatus 114 may comprise any shape and be made of any type or composition of material. In some examples, floating liquid detection apparatus 114 may be shaped like a saucer and may be configured to float on the surface of a liquid 111 within the container 112. The floating liquid detection apparatus 114 may be constructed such that the apparatus is self-righting. The self-righting ability may be achieved by, but not limited to, having a center of mass in the lower portion of the liquid detection apparatus.

The floating liquid detection apparatus 114 may include a tether 119. The tether 119 may be configured such that the floating liquid detection apparatus 114 may be removed from the container 112 with assistance from the tether 119. A first end of the tether 119 may be affixed to the floating liquid detection apparatus 114. A second end of the tether 119, opposite the first end, may be affixed to the inside of the container 112, including, but not limited to, the lid of the container 112, access points of the container 112, or any combination thereof. In some examples, the second end of the tether 119 may affix to a portion of the outside of the container 112, including, but not limited to a repeater 117, a built-in display device of the container 112, an on-container monitoring device 134 (FIG. 12), or any combination thereof. In some examples, the second end of the tether 119 may affix to built-in communication devices of the container, such that the floating liquid detection apparatus 114 may be configured to utilize a container's built-in communication devices by communicating via tether 119. In some examples, the tether 119 may be configured such that the tether 119 exits the top of the container 112 without modification to the container 112, including, but not limited to, through use of a flat wire passing under a lid of the container 112. Alternatively, in some examples where tether 119 is affixed on one end to an object outside of the container 112, the tether 119 may require modification of the container 112, such as by drilling a hole in the container 112 through which the tether 119 may pass.

In some examples, the tether 119 may operate to limit a horizontal position of the floating liquid detection apparatus 114 while still allowing the floating liquid detection apparatus 114 to move in the vertical direction in response to changes within the liquid level 118 in the container 112. In some examples, the floating detection apparatus 114 will be limited in the horizontal direction to the center of the container 112. The tether 119 may comprise a communication medium, such as a flat wire, wherein the tether 119 may communicatively couple the floating liquid detection apparatus 114 to a display device, a communication device, or any combination thereof. Examples of display devices and communication devices may include, but are not limited to, an on-container monitoring device 134 (FIG. 12), a built-in display device of the container 112, the repeater 117, a built-in communication device of the container 112, or any combination thereof.

The floating liquid detection apparatus 114 may contain one or more, or a combination, of the sensing devices disclosed above pertaining to the mounted liquid detection apparatus. These sensing devices may be configured as described above, or may additionally, or alternatively, be configured as described below.

The floating liquid detection apparatus 114 may determine its orientation through use of capacitance sensing devices. In some examples, the capacitance sensing devices may be placed in the upper portion of the floating liquid detection apparatus 114. The floating liquid detection apparatus 114 may be configured to determine whether the floating liquid detection apparatus 114 is oriented upside-down, has become submerged in the liquid 111 of the container 112, or any combination thereof. Additionally, the floating liquid detection apparatus 114 may be configured to determine that the liquid level 118 is at a level such that the top of the container 112 is preventing the floating liquid detection apparatus 114 from rising any higher in the vertical direction. In some examples, the capacitance sensing devices may be placed in the lower portion of the floating liquid detection apparatus 114. In some examples, the floating liquid detection apparatus 114 may be configured to determine that something within the container 112 is preventing the floating liquid detection apparatus 114 from lowering in the vertical direction. Additionally, the floating liquid detection apparatus 114 may be configured to determine that the liquid level 118 is so low that the bottom of the container 112 is preventing the floating liquid detection apparatus 114 from lowering in the vertical direction.

The floating liquid detection apparatus 114 may be configured to determine an orientation of the floating liquid detection apparatus 114. In some examples, the floating liquid detection apparatus 114 may comprise an accelerometer for determining the orientation of the floating liquid detection apparatus 114. A non-level orientation may indicate that the center of mass of the floating liquid detection apparatus 114 is not horizontally centered within the floating liquid detection apparatus 114. Additionally, a non-level orientation may indicate that the tether 119 is creating a force on the floating liquid detection apparatus 114 causing the floating liquid detection apparatus 114 to be non-level. Further, an inverted orientation measurement may indicate that the floating liquid detection apparatus 114 is in an upside-down orientation.

In some examples, the floating liquid detection apparatus 114 may be configured to determine existence of acceleration, movement, speed, change in location of the floating liquid detection apparatus 114, or any combination thereof. The floating liquid detection apparatus 114 may comprise an accelerometer for completing this determination. The existence of any of these measurements may indicate that the liquid level 118 is increasing through addition of liquid to the container 112. Additionally, these measurements may indicate that the liquid level 118 is decreasing through evaporation, the container 112 leaking, liquid being removed from the container 112, or any combination thereof. Additionally, these measurements may indicate disruptions in the surface of the liquid 111. Additionally, these measurements may indicate that the floating liquid detection apparatus 114 is moving in the horizontal direction, which may, in turn, indicate that the tether 119 is not properly limiting the horizontal position of the floating liquid detection apparatus 114.

In some examples, the floating liquid detection apparatus 114 may be configured to determine a liquid level 118 by measuring a vertical position of the floating liquid detection apparatus 114 in relation to the top of the container 112, the bottom of the container 112, or any combination thereof. In some examples, the floating liquid detection apparatus 114 may comprise an ultrasonic measuring device, which may ping 116 the top of the container 112, the bottom of the container 112, or any combination thereof. The floating liquid detection apparatus 114 may comprise sonar, radar, photographic distance measurements, or any combination thereof for determining the liquid level 118. Further, in some examples, the tether 119 may be used for indication of the vertical position of the floating liquid detection apparatus 114 based, at least in part, on the position of the tether 119. Once the vertical position of the floating liquid detection apparatus 114 is determined, calculations may be performed by a processing device to determine the volume of the liquid 111 based at least in part on the liquid level 118, the dimensions of the container 112, or any combination thereof. The processing device may include processing device 31 (FIG. 3), processing device 41 (FIG. 4), processing device 105 (FIG. 9), remote monitoring device 53 (FIG. 5), or any combination thereof. The floating liquid detection apparatus 114 and the calculations performed may determine the volume of the liquid to a predetermined level of precision. In some examples, the predetermined level of precision may be a tenth of a gallon.

In some examples, the container 112 may comprise built-in control devices (not shown) that perform one or more of the measurements which the floating liquid detection apparatus 114 is configured to measure. In the situations where this occurs, the floating liquid detection apparatus 114 may be configured to act as a verification of measurements obtained by the container's 112 built-in control devices. In some examples, floating liquid detection apparatus 114 may be communicatively coupled to the container's 112 built-in control devices wirelessly, through tether 119, or any combination thereof. In the situations where the container's 112 built-in control devices and the floating liquid detection apparatus 114 are communicatively coupled, the floating liquid detection apparatus 114 may initiate an alert indicating calibration is required for the container's 112 built-in control devices, the floating liquid detection apparatus 114, or any combination thereof. In some examples, the floating liquid detection apparatus 114 may communicate commands to the container's 112 built-in control devices requesting action including, but not limited to, modifying a temperature setting of a container's 112 cooling system.

The floating liquid detection apparatus 114 may comprise a communication device, such as communication devices 37 or 106 (FIG. 3 and FIG. 9, respectively). The floating liquid detection apparatus 114 may comprise a Bluetooth transceiver, such as Bluetooth transceiver 82 (FIG. 8). The floating liquid detection apparatus 114 may be configured to communicate wirelessly using Bluetooth, wireless, magnetic, Wi-Fi, near-field, radio, radio frequencies, radio frequency identification (RFID), other types of communication systems/protocols, or any combination thereof. Additionally, or alternatively, the floating liquid detection apparatus 114 may be configured to communicate by wire, including, but not limited to, through tether 119. In some examples, the floating liquid detection apparatus 114 may be configured to communicate with a computing device, remote monitoring device 53 (FIG. 5), or any combination thereof. In some examples, the floating liquid detection apparatus 114 may be configured to communicate wirelessly or by wire to the repeater 117, a display, a communication device, or any combination thereof. In some examples, the floating liquid detection apparatus 114 may comprise monitoring device 134 (FIG. 12), built-in display devices of the container 112, built-in communication devices of the container 112, or any combination thereof.

The floating liquid detection apparatus 114 may transmit, broadcast, or otherwise communicate information associated with a container 112, a liquid 111 within the container 112, or any combination thereof in real-time. Alternatively, the floating liquid detection apparatus 114 may transmit, broadcast, or otherwise communicate the information at selected intervals, such as once a day. Additionally, or alternatively, the floating liquid detection apparatus 114 may be configured to transmit diagnostic information, such as diagnostic information 52 (FIG. 5), receive information, receive commands, or any combination thereof. In one example, the floating liquid detection apparatus 114 may be configured to set parameters of the communication device, such as to select what information is transmitted, to which devices the information is transmitted, or any combination thereof.

Repeater 117 may be affixed to container 112, comprise a lid configured to cover container 112, or any combination thereof. Repeater 117 may comprise one or more Bluetooth repeaters, Wi-Fi repeaters, radio repeaters, radio frequency repeaters, RFID repeaters, wireless repeaters, or any combination thereof. Repeater 117 may be configured to permit communication within a structure, such as a winery, or may permit communication between structures or over long distances. In some examples, the repeater 117 may be configured to limit communication to a specified area, such as a structure, for security purposes or preventing unintended dissemination of the communication.

Figure 11:
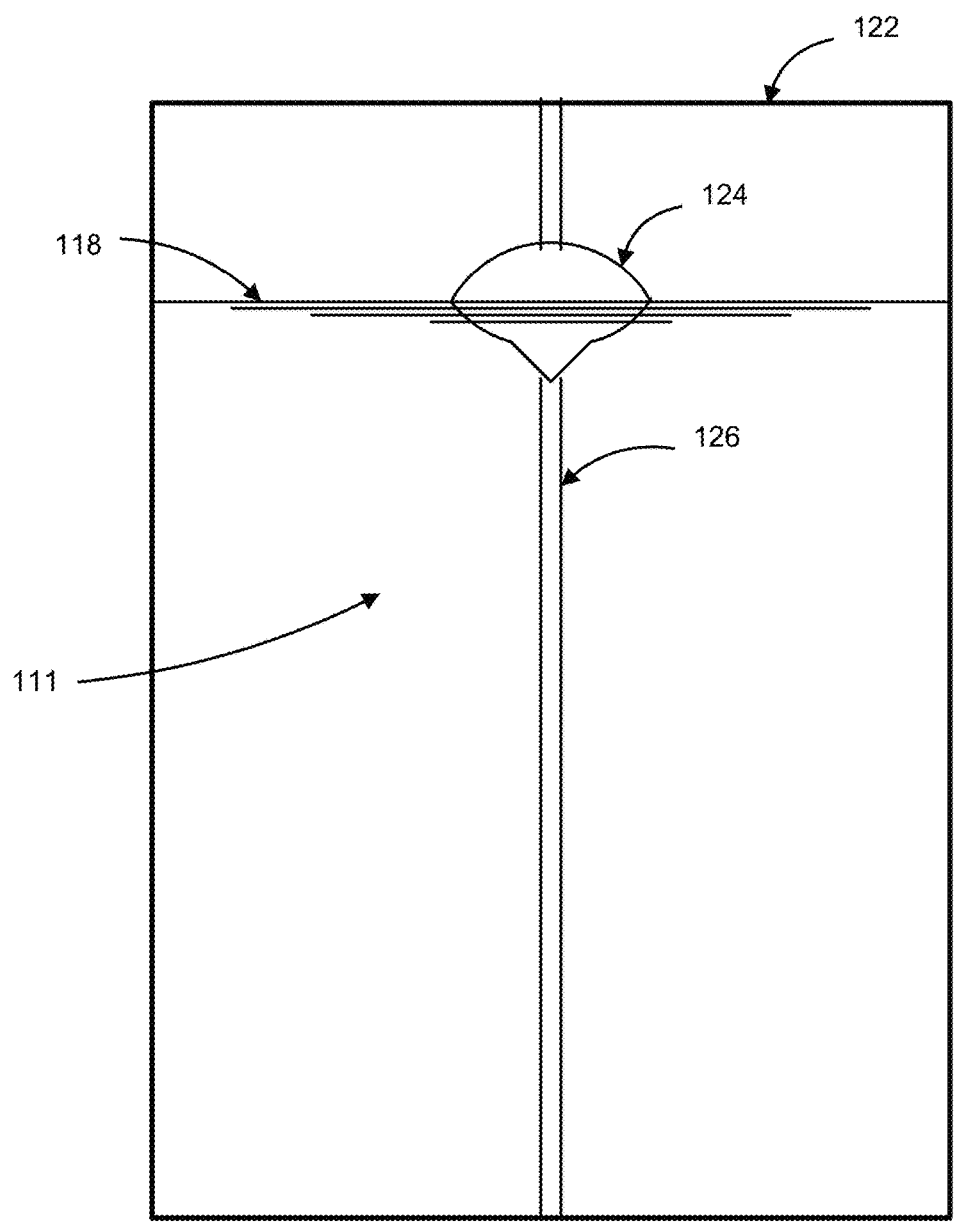
FIG. 11 illustrates a cross-sectional view of a container including an example floating liquid detection apparatus with a guidance mechanism.

FIG. 11 illustrates a cross-sectional view of a container 122 including an example floating liquid detection apparatus 124 with a guidance mechanism 126. Floating liquid detection apparatus 124 may comprise one, a combination, or all of the features of floating liquid detection apparatus 114 (FIG. 10). Further, the floating liquid detection apparatus 124 may be coupled to the guidance mechanism 126. The floating liquid detection apparatus 124 may be coupled to the guidance mechanism 126 along the edge of the floating liquid detection apparatus 124, passing through the floating liquid detection apparatus 124, or any combination thereof. The floating liquid detection apparatus 124 may not be required to be self-righting since guidance mechanism 126 may prevent changes in orientation of the floating liquid detection apparatus 124.

The guidance mechanism 126 may be manufactured as part of the container 122 or may be installed at a later time. The guidance mechanism 126 may be configured to reside anywhere within the container 122 such as, but not limited to, the center of the container 122 or along the inside edge of the container 122. The guidance mechanism 126 may be configured to limit the horizontal movement of the floating liquid detection apparatus 124, while still allowing vertical movement of the floating liquid detection apparatus 124 in response to changes in the liquid level 118. The guidance mechanism 126 may comprise a pole extending from the bottom to the top of the container 122, a track mechanism, a rope system, or any combination thereof. In some examples, the guidance mechanism 126 may comprise one or more of the sensing devices described in this disclosure and may be communicatively coupled to the floating liquid detection apparatus 124.

The floating liquid detection apparatus 124 may be configured to determine the liquid level 118. In some examples, the floating liquid detection apparatus 124 may determine the liquid level by the same means described for floating liquid detection apparatus 114. In some examples, the floating liquid detection apparatus 124 may determine the liquid level by measurement of position, or change in position, of the floating liquid detection apparatus 124 in relation to the guidance mechanism 126. The resulting measurement may be used in calculating the volume of the liquid 111 to a predetermined precision level. In some examples, the predetermined precision level may be a tenth of a gallon.

Figure 12:
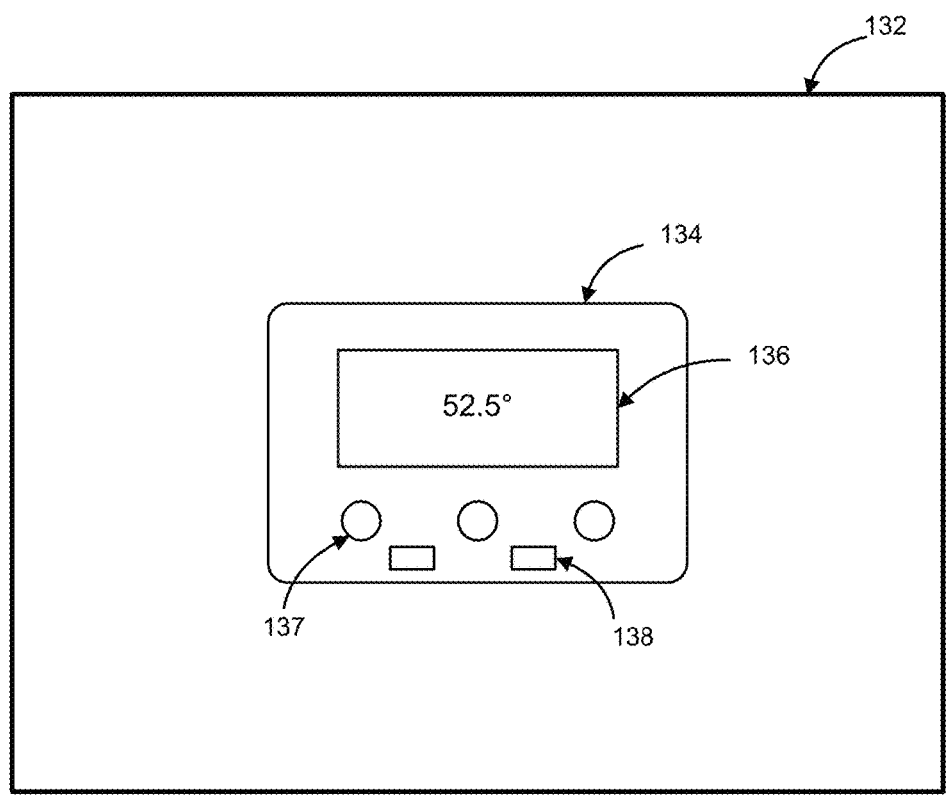
FIG. 12 illustrates an example on-container monitoring device affixed to a portion of a container.

FIG. 12 illustrates an example on-container monitoring device 134 affixed to a portion of a container 132. The on-container monitoring device 134 may comprise a display 136, an alerting signal 137, a user interactive device 138, or any combination thereof. The on-container monitoring device 134 may be manufactured as a part of the container 132, affixed to the container 132, or any combination thereof.

On-container monitoring device 134 may be communicatively coupled to a floating liquid detection apparatus, such as floating liquid detection apparatus 114 (FIG. 10) or floating liquid detection apparatus 124 (FIG. 11). In some embodiments, on-container monitoring device 134 may be communicatively coupled via hard-wiring to a floating liquid detection apparatus by, but not limited to, tether 119. In some embodiments, on-container monitoring device 134 may be configured to communicate wirelessly with a floating liquid detection apparatus using, but not limited to, one or more communication protocols, such as Bluetooth, wireless, magnetic, Wi-Fi, near-field, radio, radio frequencies, radio frequency identification (RFID), other types of communication systems/protocols, or any combination thereof.

Display 136 may be configured to display any information transmitted by a floating liquid detection apparatus including, but not limited to, diagnostic information 52 (FIG. 5). Display 136 may be configured to allow a user to select which information is shown on display 136, how the information is displayed, or any combination thereof. Further, display 136 may be configured to alert a user if the information from a floating liquid detection apparatus indicates possible issues by lighting the display, displaying an alert message, or any combination thereof.

Alerting signal 137 may comprise a visible alert, an audible alert, or any combination thereof. The alerting signal 137 may be configured to indicate a state associated with a floating liquid detection apparatus, a container, a liquid within the container, or any combination thereof. The state may be determined by measurements returned from a floating liquid detection apparatus. In some examples, alerting signal 137 may comprise one or more light emitting diodes (LEDs). Alerting signal 137 may be configured to produce varying outputs depending on the state of the floating liquid detection apparatus. In some examples, the alerting signal 137 may indicate whether a container requires attention by outputting different audible tones, audible speech, or any combination thereof. In some examples, the alerting signal 137 may comprise LEDs configured to display different colors, flash on and off, alternate between different colors, or any combination thereof. In some examples, the alerting signal may perform different output sequences to indicate the state of a floating liquid detection apparatus, a container, a liquid within container 132, or any combination thereof. In some examples, alerting signal 137 may be configured to indicate low battery of a floating liquid detection apparatus, the on-container monitoring device 134, or any combination thereof. In some examples, alerting signal 137 may be configured to indicate a container does not require attention, a container requires non-immediate attention, or a container requires immediate attention. Further, alerting signal 137 may be configured to provide an indication for why a container requires attention.

User interaction input 138 may comprise a button, a keyboard, other peripheral devices, or any combination thereof. In some embodiments, the user interaction input 138 may comprise one or more ports by which a peripheral device or a computing device may connect, including, but not limited to, a tablet, a laptop, a smart phone, a personal digital assistant (PDA), an RFID reader, a scanner, other types of hand-held user devices, or any combination thereof. The user interaction input 138 may be configured to provide commands to the on-container monitoring device 134, a floating liquid detection apparatus, such as floating liquid detection apparatus 114 (FIG. 10) or floating liquid detection apparatus 124 (FIG. 11), or any combination thereof. The commands may include dismissing a visible alert, an audio alert initiated by the on-container monitoring device 134, or any combination thereof. The user interaction input 138 may be configured to request real-time information from a floating liquid detection apparatus for display to a user, such that it can be determined if action needs to be taken in response to an alert, what action needs to be taken in response to an alert, or any combination thereof.

An example system may include the liquid detection apparatus 114 configured to float on a surface 118 of the liquid within the container 112. The liquid detection apparatus 114 may be configured to determine the level of the surface 118 in relation to the container 112 using sonar and transmit the determined level to a server for processing. One or more capacitive sensing devices may be mounted to at least one of a bottom or a top of the liquid detection apparatus 114. The capacitive sensing devices may be configured to determine an orientation of the liquid detection apparatus 114 based on a presence of the liquid.

A further example system may include the tether 119 that may be affixed to the liquid detection apparatus 114 and the tether 119 may be configured to maintain a horizontal position of the liquid detection apparatus 114 within the container 112. The liquid detection apparatus 114 may be configured to float on the surface 118 of the liquid within the container 112 and determine the level of the surface 118 in relation to the container 112. The determined level may be transmitted to a communication device 117 outside of the container 112 via the tether 119.

Submerged Liquid Detection Apparatus

Figure 13:
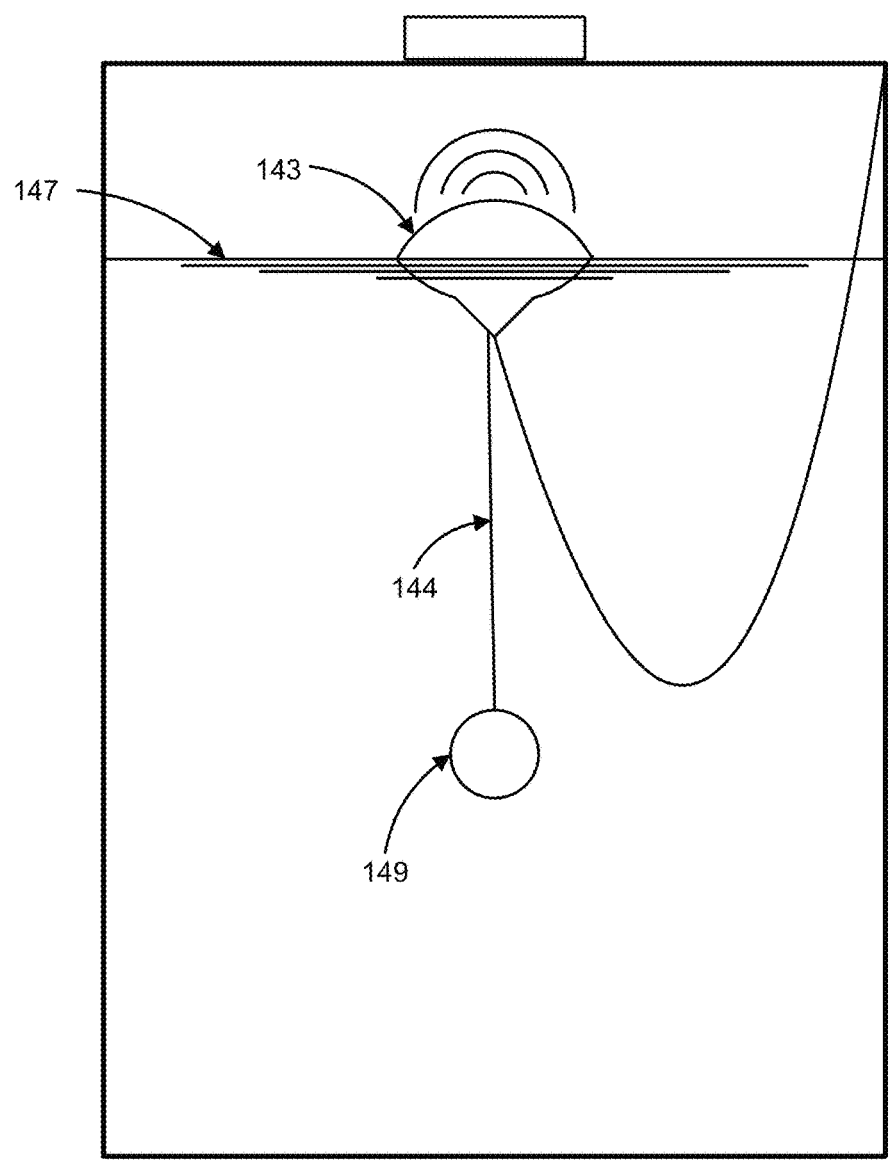
FIG. 13 illustrates a cross-sectional view of a container including an example floating liquid detection apparatus with a submerged liquid detection apparatus.

FIG. 13 illustrates a cross-sectional view of a container including an example floating liquid detection apparatus 143 with a submerged liquid detection apparatus 149. Submerged liquid detection apparatus 149 may comprise all, or a combination of one or more of the features of the examples of mounted liquid detection apparatuses or the floating liquid detection apparatuses described above. Submerged liquid detection apparatus 149 may be located within a container comprising a mounted liquid detection apparatus or a floating liquid detection apparatus, or may be located in a container separate from a mounted liquid detection apparatus or a floating liquid detection apparatus.

Submerged liquid detection apparatus 149 may be weighted such that the submerged liquid detection apparatus 149 will remain submerged in the liquid 147 within a container, such as tank 142. The submerged liquid detection apparatus 149 may be connected to a floating liquid detection apparatus 143 or a mounted liquid detection apparatus, as described above, by a tension-bearing tether 144. In some examples, tension-bearing tether 144 may communicatively couple the submerged liquid detection apparatus 149 to the floating liquid detection apparatus 143 or the mounted liquid detection apparatus. The submerged liquid detection apparatus 149 may perform all, or some, of the same measurements as disclosed above relating to the floating liquid detection apparatuses or mounted liquid detection apparatuses at a different level within the container. These measurements may allow the system to determine if differences in measurements exist at the level of the submerged liquid detection apparatus 149 and whether action is required due to these differences.

The submerged liquid detection apparatus 149 may be attached to the non-submerged liquid detection apparatus 143 by the tension-bearing tether 144. The submerged liquid detection apparatus 149 may be configured to perform a measurement of the liquid in which the submerged liquid detection apparatus 149 is submerged and may transmit the result of the measurement to the non-submerged liquid detection apparatus 143 via the tension-bearing tether 144. In some examples, performing the measurement of the system may comprise measuring the temperature of the liquid and the result of the measurement may be the temperature of the liquid.

Device Communication

Figure 14:
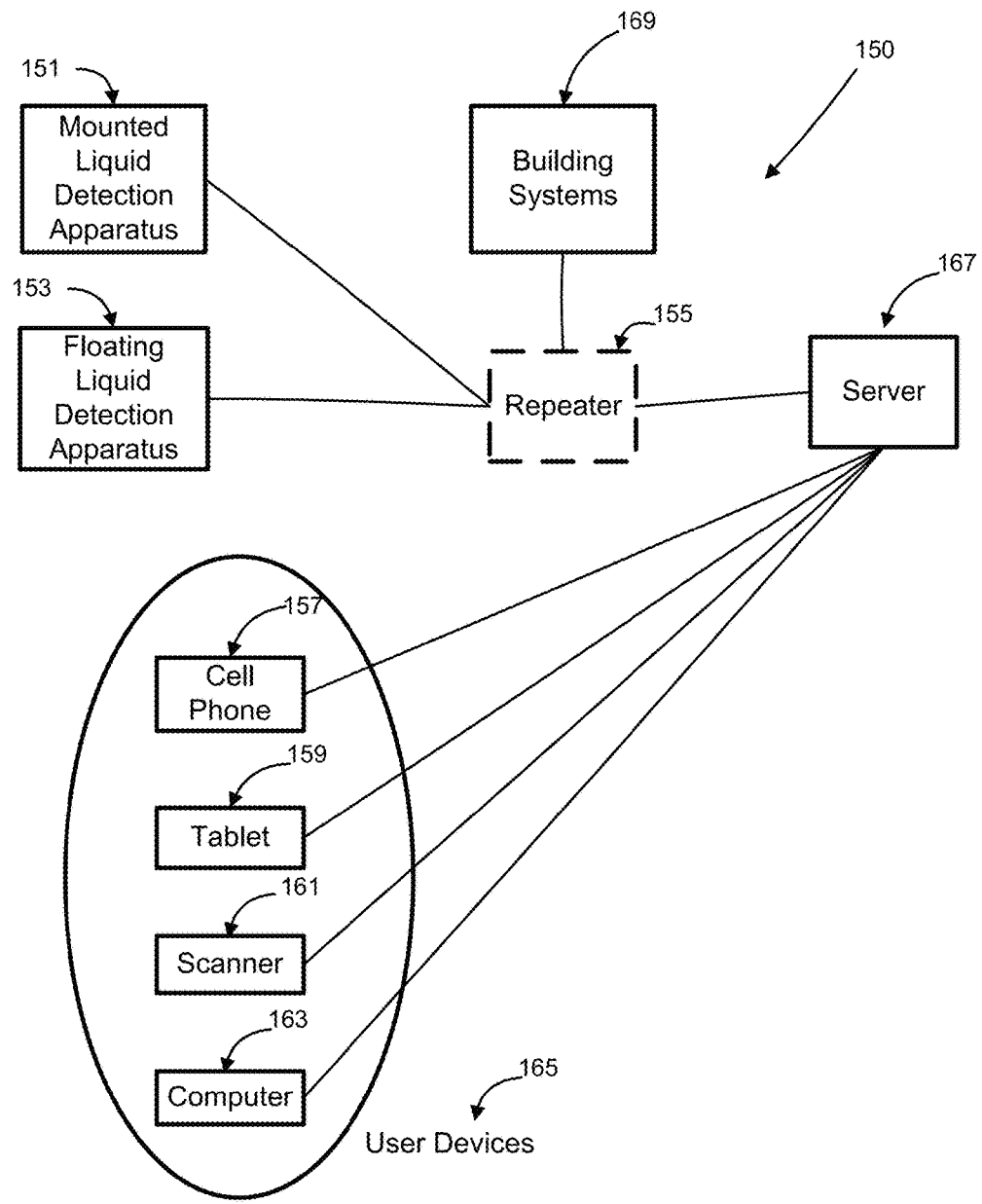
FIG. 14 illustrates an example communication network.

FIG. 14 illustrates an example communication network 150. One or more mounted liquid detection apparatuses 151, one or more floating liquid detection apparatuses 153, or a combination of mounted liquid detection apparatuses 151 and floating liquid detection apparatuses 153 may be communicatively coupled to a server 167. In some examples, one or more repeaters 155 may be communicatively coupled intermediate the liquid detection apparatuses and the server 167 providing for communication of data over longer areas. Server 167 may be configured to receive and store information and data gathered by the liquid detection apparatuses, including but not limited to the data gathered by the sensors of each liquid detection apparatus, and may be configured to send commands to the liquid detection apparatuses.

Communication between the liquid detection apparatuses and the server 167 may occur continuously, providing for real-time acquisition of data. Alternatively, in some examples energy efficiency may be achieved by limiting communication between the liquid detection apparatuses and the server 167 to preset intervals, providing for substantially real-time acquisition of the data.

In some examples, server 167 may be communicatively coupled to building systems 169 allowing server 167 to receive data from the building systems 169 and issue requests for action to the building systems 169. Building systems 169 may comprise heating, air conditioning, measurements of ambient building temperature, any other building control or monitoring systems known, or any combination thereof. Server 167 may receive data from the building systems 169, including but not limited to the ambient building temperature, such that it may be determined whether corrective action needs to be taken to cure issues within the building. Further, server 167 may generate requests delivered to the building systems 169 in response to data from the building systems 169 being outside of a desired range, data from the liquid detection apparatuses being outside of a desired range, a request from a user device 165, or any combination thereof. The requests may be utilized to correct an issue through use of benefits provided by the building systems 169. Requests made by the server 167 may comprise, but are not limited to, turning on the heating system to raise the ambient temperature, turning on the air conditioning to lower the ambient temperature, or any combination thereof.

Server 167 may be communicatively coupled to one or more user devices 165, including but not limited to handheld user devices, such as cell phone 157, tablet 159, or scanner 161, or relatively stationary user devices, such as a computer 163. In some examples, one or more repeaters 155 may be communicatively coupled intermediate the one or more user devices 165 and the server 167 providing for communication of data over longer areas. Server 167 may transmit any of the data received from the liquid detection apparatuses to the one or more user devices 165. Further, the one or more user devices 165 may transmit data inputted into the one or more user devices 165 to the server 167, or may issue requests for certain data from the server 167 or for the server 167 to provide data transmitted from the server 167 to be formatted differently. Data transmitted from the user devices 165 may include, but is not limited to, the type of wine barrel, the type of liquid in the wine barrel, when the wine barrel was purchased, the manufacturer of the wine barrel, the location of the wine barrel, the price of the wine barrel, or any combination thereof. Communication network 150 may be configured to specify which data is transmitted between the user devices 165 and the server 167, and the format of the transmitted data.

User devices 165, such as cell phone 157, tablet 159, scanner 161, and computer 163, may display data received from server 167 for viewing by a user. User device 165 may request data from the server 167 to be displayed on the user device 165. Further, user device 165 may be configured to change the format of the data being displayed, or to change which data is being displayed on the user device 165. A user device 165 may receive data to be transmitted to the server 167, or send a request to the server 167 that an action be taken by one of the devices communicatively coupled to the server 167.

User devices 165 may further be configured to display an alert in response to the server 167 receiving an alert from one of the liquid detection apparatuses. For example, when a mounted liquid detection apparatus 151 has been ejected from a barrel, a user device 165 may receive an alert and may perform an action, such as emitting noise, vibrating, or flashing, to notify a user, other actions to grab a user's attention, or any combination thereof. An alert may be displayed as a text message, an instant message, an email, or any combination thereof on a user device 165. Further, a user device 165 may be configured to make noise, display a message, flash, or any combination thereof in response to receiving an alert in order to gain the attention of a user. The alert on the user device 165 may be configured to correspond to an alert on the liquid detection apparatus, such as the liquid detection apparatus making noise or displaying flashing lights, such that a liquid detection apparatus that issued an alert may be quickly located.

The server 167 may be communicatively coupled to the liquid detection apparatus 151. The server 167 may be configured to receive a communication from the liquid detection apparatus 151 that includes data acquired by the liquid detection apparatus 151. The data may be transmitted to one or more user devices 165 for display on the one or more user devices 165. Additionally, the server 167 of the system may be further configured to receive a request for the data from the one or more user devices 165 and the transmission of the data may occur in response to the server receiving the request.

In some examples, the server 167 may be communicatively coupled to the liquid detection apparatus 151. The server 167 may be configured to receive a communication from the liquid detection apparatus 151 that includes data acquired by the liquid detection apparatus 151. Further, the server 167 may be configured to determine whether corrective action should be taken based on the data and transmit, to the building systems 169 associated with the liquid detection apparatus 151, a request for the corrective action in response to determining the corrective action should be taken.

Location Management

Figure 15:
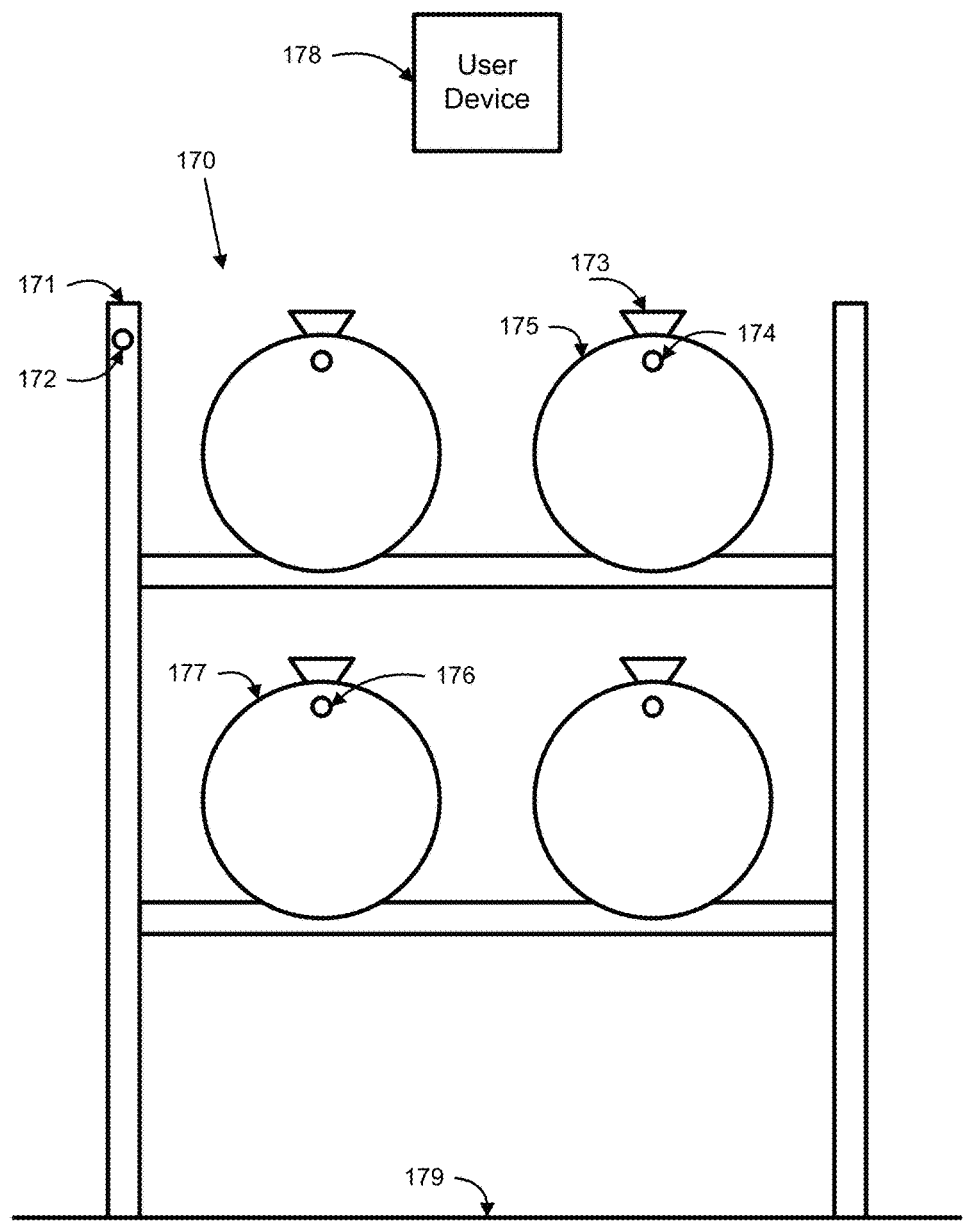
FIG. 15 illustrates an example layout of a wine barrel storage system.

FIG. 15 illustrates an example layout of a wine barrel storage system 170. The wine barrel storage system 170 may be used to track and maintain records of locations of a plurality of wine barrels. A winery may have a plurality of racks, such as rack 171, for storing wine barrels, such as wine barrel 175 and wine barrel 177. Each wine barrel may have a stopper 173, which may comprise any of the examples of the mounted liquid detection apparatuses described above. Each rack may reside in a plurality of floor locations, such as floor location 179, at different times throughout the process of making the wine.

In some examples, each component, or any combination thereof, displayed by the wine barrel storage layout 170 (rack 171, wine barrel 175, wine barrel 177, stopper 173, and floor location 179) may have its own, unique identifier. The identifier may comprise a serial number, an RFID code, a barcode, or any combination thereof. A user device 178, which may include user devices 165 (FIG. 14) or remote monitoring device 53 (FIG. 5), may be able to read the identifier or have the identifier input into the user device by a user. The user device 178 may be equipped with a scanner or a camera to read a barcode or a serial number and may be equipped with optical character recognition to interpret the serial number. Further, the user device 178 may be configured to receive input of a serial number from a user. In some examples, the user device 178 may be able to wirelessly sense when the device is within a proximity of the RFID code and may be configured to identify a component by the RFID code. The unique identifiers for a component may be associated with one or more unique identifiers for other components to determine an exact location of a wine barrel within the winery.

An example utilizing barcodes as the unique identifier may comprise associating floor location 179, rack 171, wine barrel 175, and stopper 173 together to provide an exact location of wine barrel 175 and associating data retrieved by stopper 173 with wine barrel 175. Each component of the example layout of a wine barrel storage system 170 may be associated with other components in the system by entering an association mode on the user device then scanning the barcodes on floor location 179, rack 171, wine barrel 175, and stopper 173. Further, a barcode may be placed on rack 171 at each barrel location such that each barrel may be identified by its location on rack 171. For example, a barcode may be placed on rack 171 below wine barrel 175 and another barcode may be placed on rack 171 below wine barrel 177, such that if a wine barrel 175 is scanned followed by the barcode below wine barrel 175, wine barrel 175 will be associated with the upper right location of rack 171. The barcodes may be printed on a component, may comprise adhesive labels, metal plates with barcodes printed on the plates, or 2D labels adhered to a component, or may be a combination of any of these. Associations of some components may be maintained while changing the associations of other components. For example, if rack 171 is moved to a different floor location the rack may be associated with the new floor location while wine barrel 175 maintains its association with the upper right location of rack 171 and stopper 173 maintains its association with wine barrel 175.

In some examples, a sensor 172 may be affixed to the rack 171 and may be configured to communicate with the stopper 173. The stopper 173 may be able to determine its position in relation to the rack 171 by broadcasting a signal requesting a location identifier from sensors located near the stopper 173. In response to detecting the broadcasted signal from the stopper 173, the sensor 172 may transmit a location identifier associated with the rack 171 to the stopper 173. The stopper 173 may be configured to store the location identifier associated with the rack 171 and transmit the location identifier in response to receiving a request. The user device 178 may be configured to communicate with one or both of the rack 171 and the stopper 173, and may generate as association between the rack 171 and the stopper 173 based on the stopper 173 determining its location.

The sensor 172 may be further configured to determine the location of the rack 171 within a winery site. The winery site may include one or more winery sensors located throughout the winery. The sensor 172 may be configured to broadcast a signal requesting a location identifier from the winery sensors. One or more of the winery sensors may transmit a response including one or more location identifiers associated with the one or more winery sensors to sensor 172. Sensor 172 may store the location identifiers associated with the winery sensors and may further be configured to transmit the location identifiers associated with the winery sensors to stopper 173 in response to receiving a request.

In some examples, the sensor 172 associated with the rack 171 may be configured to identify and store unique identifiers for stoppers located on the rack 171. The sensor 172 may broadcast a signal requesting identification from the stoppers. The signal may be transmitted within a certain proximity such that the stoppers on the rack 171 receive the signal. The stopper 173 may receive the broadcasted signal and transmit a unique identifier associated with the stopper 173 to the rack 171 in response to receiving the broadcasted signal. The sensor 172 may receive and store the unique identifier associated with the stopper 173. The process of receiving the unique identifier may be repeated for each stopper on the rack 171. In response to receiving a request, the sensor 172 may transmit a response including an indication of the stoppers located on the rack 171. The sensor 172 may maintain the stored unique identifiers of the stoppers located on the rack 171 when the rack 171 is moved to different locations within a winery.

The user device 178 may be communicatively coupled to one or both of sensor 172 and stopper 173. The user device 178 may be configured to locate the rack 171 within a winery site by communicating with sensor 172. In response to a trigger, such as a user entering an input on the user device 178, the user device may broadcast a request for a location of the rack 171. In response to receiving the broadcasted request, the sensor 172 may transmit the stored location identifiers associated with the one or more winery sensors. Upon receiving the location identifiers, the user device 178 may display the location identifier allowing a user to identify a location of the rack 171. In some examples, the user device may display one or both of a map indicating the location of the rack 171 and directions to the rack 171.

The sensor 172 and the user device 178 may be configured to communicate by one or more communication protocols, including wireless, magnetic, Wi-Fi, near-field, radio, radio frequencies, radio frequency identification (RFID), Bluetooth, other types of communication systems/protocols, or any combination thereof. In some examples, the user device 178 is within a certain proximity of the sensor 172 when communicating with the sensor 172. When outside of the certain proximity, the user device 178 may be unable to communicate with the sensor 172.

Further, the user device 178 may be configured to locate the stopper 173 within the winery site by communicating with one or both of the sensor 172 and stopper 173 through a similar process as described above for locating the rack. However, in response to receiving a request for a location of the stopper 173 initiated by the user device 178, the stopper 173 may transmit the location identifier associated with the rack, the location identifier associated with one of the winery sensors, or any combination thereof. Further, the stopper 173 may be configured to perform actions to draw attention to it. For example, the stopper 173 may be configured to make noise, flash lights, transmit a signal indicating its location, or any combination thereof to draw attention to the stopper 173 in response to receiving the request for the location of the stopper 173.

In some examples, a second sensor 174 and a third sensor 176 may be affixed to wine barrel 175 and wine barrel 177, respectively, and may be configured to communicate with the sensor 172 and the stopper 173. The second sensor 174 and the third sensor 176 may operate similarly to sensor 172. Further, the user device 178 may be able to locate wine barrel 175 and wine barrel 177 through steps similar to locating the rack discussed above.

Network

Figure 16:
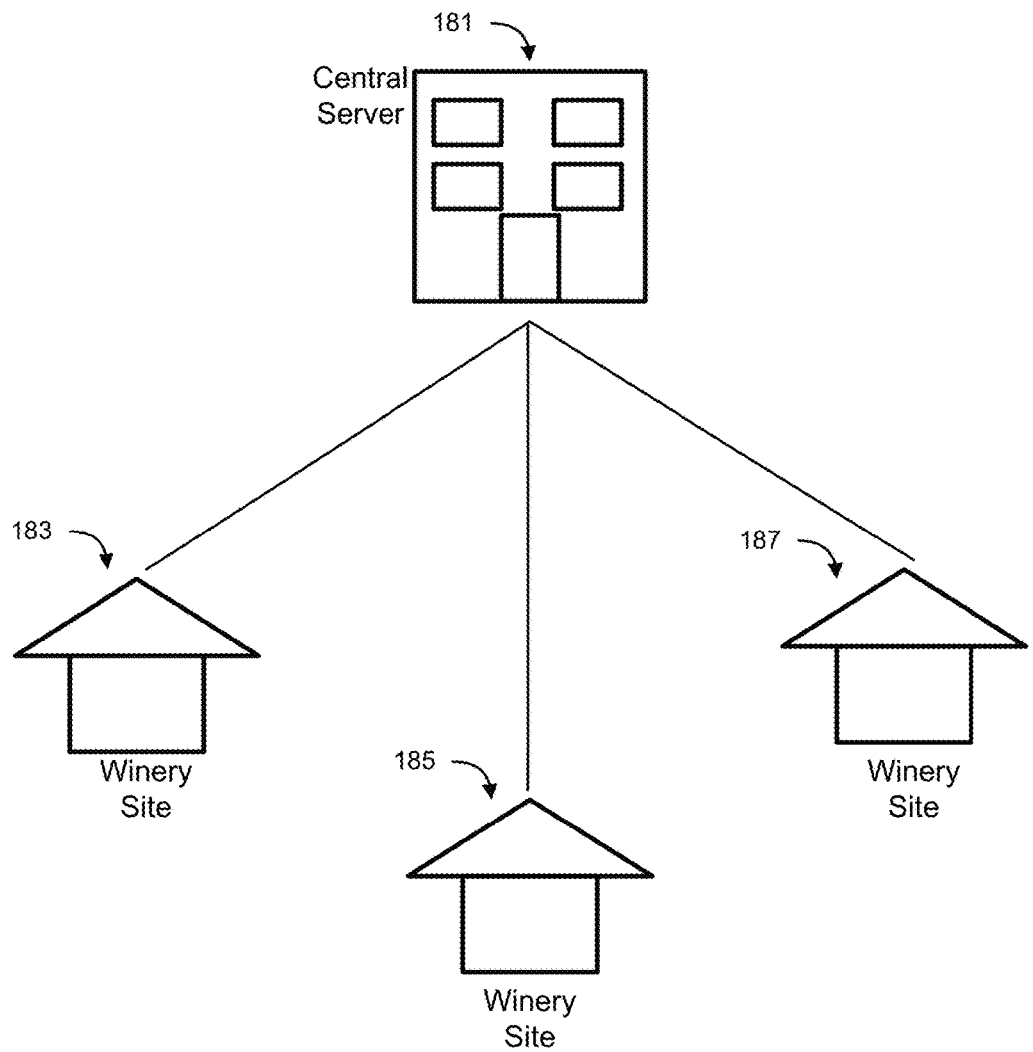
FIG. 16 illustrates an example network of winery sites and a central server.

FIG. 16 illustrates an example network 180 of winery sites 183, 185, 187 and a central server 181. Central server 181 may comprise a single computing device, a network of multiple computing devices, a website maintained on an internet, a cloud computing structure, or any combination thereof. Winery site 183, winery site 185, and winery site 187 may be a plurality of locations maintained by a single winery, may be a plurality of locations maintained by a plurality of wineries, or any combination thereof. Winery site 183, winery site 185, and winery site 187 may be located at distant locations from each other, including but not limited to being located on separate continents.

Central server 181 may be communicatively coupled to a plurality of winery sites, such as winery site 183, winery site 185, and winery site 187, and may be configured to receive and store data from each of the winery sites. Data received from a winery site may be associated with the winery site that transmitted the data, such that the data's origin can be traced back to that winery site. The central server 181 may be configured such that the data received from a winery site can be accessed by that winery site, can be accessed by a portion of all the winery sites communicatively coupled to the central server 181, or can be accessed by all of the winery sites communicatively coupled to the central server 181. The central server 181 may be configured to allow a user with proper authorization, including but not limited to a registered user at a winery site that is providing the data, to define which other winery sites may receive the data provided by the winery site and which portion of the transmitted data may be accessed by the other winery sites.

Further, with proper authorization, central server 181 may be configured to allow the plurality of winery sites to access data stored by the central server 181. The central server 181 may be configured such that a winery site requesting access to data may be only able to access part of the data maintained by the server. For example, central server 181 may allow a winery site to access measurements transmitted to the central server 181 by a different winery site, but may prevent access to identifying data of the different winery site, such as winery name or winery location, to provide for anonymity of the different winery site. In some examples, access to data on the central server 181 may be limited to a membership of users, such as subscribers paying a fee to access the data. In some further examples, non-members may be limited to accessing a small portion of data stored on central server 181, such as only data transmitted to the server by the non-member's winery site, while members may access a larger portion of the data stored on central server 181.

Report Generation

A plurality of reports may be generated from data stored on central server 181 or data collected at the individual winery sites. The reports may be updated continuously, may be generated at the time a report request is received, at preset times or intervals, or any combination thereof. The reports may be customizable. For example, the reports may be generated upon receiving a request from a user device, such as user devices 165, so that the report is available when a user desires. In some examples, the reports may be generated each morning such that it can be determined if any issues developed overnight.

In some examples, the data included in the reports and in what format the data is presented in the reports is customizable allowing the data to be limited to desired data. What devices the reports are delivered to and in what format the reports are displayed on a device may be configurable. For example, it may be beneficial to receive a graph of the data on a cell phone where the display is smaller while a larger display, such as on a tablet, may provide adequate presentation area for a spreadsheet of the same data such that numerical data can be viewed for greater precision.

The reports may be formatted many different ways with each format achieving a desired benefit. The reports may comprise graphs, such as line graphs or bar graphs, which allow a large amount of data to be quickly viewed. Reports may be presented in diagram format, such as a Venn diagram, such that it may be determined whether a relationship between portions of acquired data exists. Data within the reports may be presented in spreadsheet format such that data at discrete points in time may be viewable.

A report may be customizable, such as by defining which measured values or constants are being compared in a report. For instance, a report may be generated showing the level of a liquid within a barrel over time. Different reports showing the temperature of a liquid in a barrel versus the Brix content of the liquid in the barrel may be generated. Further, a report may be configured to display multiple variables compared to a constant, such as displaying the level of liquid in a barrel, the Brix content of the liquid in the barrel, and the ambient temperature of the building in which the barrel is located over a period of time.

A group report may be generated based on a certain characteristic, such as a report showing the liquid levels of all wine barrels of a certain type and/or age over time allowing determination of whether a certain type of wine barrel allows greater amounts of evaporation or has a greater tendency to leak than a different type of wine barrel. Further, a group report may be generated based on the stage of wine production, such as a report showing the Brix content during the fermentation phase of all wine barrels containing a certain type of wine over time.

Further, reports may be generated comparing performance of wine barrels located at different locations within a winery. For example, a report may be generated comparing the liquid level over time of a certain type of wine within wine barrels located high on a rack with the liquid level over time of the same type of wine within barrels located low on a rack. It may be determined whether a certain type of wine performs better when placed high on a rack for storage, whereas a different type of wine performs better when placed low on a rack for storage. A report may also be created comparing performance for different locations within a winery so it can be determined if certain locations within the winery present special concerns during the wine making process, such as direct sunlight hitting a certain portion of the winery causes that portion of the winery to have a greater ambient temperature than other portions of the winery.

Reports may also be generated listing which liquid detection apparatuses require attention. In some examples, a report may be generated each morning, or at other preset time intervals, with a list of liquid detection apparatuses that require attention and what attention each liquid detection apparatus requires. The report may comprise a list of all liquid detection apparatuses displaying a red light indicating a need for immediate attention and a separate list of all liquid detection apparatuses displaying a yellow light indicating a need for non-immediate attention. Further, if any of the liquid detection apparatuses have been ejected, the report may generate a list of the locations of the liquid detection apparatuses that have been ejected.

In some examples, reports may be generated showing where neglect or certain circumstances have led to issues with particular barrels. For example, a report may be generated listing all barrels that were improperly topped with additional liquid or where a barrel missed a topping such that it can be determined whether more training or greater attention is required. Reports may also be generated where bacteria growth has occurred within a barrel or a temperature inside the barrel has risen due to malic acid development and, therefore, the barrel requires attention. Further, reports may be generated listing all barrels that need to be replaced, which may be determined by a level of liquid in a barrel decreasing at a greater than an acceptable rate.

Any of the reports generated may be accessed by a user device, such as user devices 165. The user device may be configured to display a certain report in response to the user device receiving an identifier for a specific barrel or a group of barrels. In some examples, the identifier may be received by scanning a barcode on a specific barrel, a stopper, a group of barrels, a rack, or a floor location. Further, in response to the scanning of a barcode, the user device may display an acceptable range of a measurement, such as temperature or Brix content, for the specific barrel or groups of barrels, or may display an average value of barrels with similar characteristics such that it can be determined whether the measurement is within an acceptable range.

Any of the reports discussed above may be generated at a central server level, such as at central server 181. These reports may be generated using data received from a single winery, data received from a portion of the wineries communicatively coupled with the central server, or all of the wineries communicatively coupled with the central server. These reports then may be accessed by each of the wineries communicatively coupled with the central server. In some examples, access to these reports may be limited to certain wineries, such as wineries that purchase a membership to access the reports or purchase the specific report. It will be understood that variations and modifications may be affected without departing from the spirit and scope of the novel concepts of this disclosure.

FIG. 17 illustrates an example table 1700 presenting report data. Table 1700 may include rows corresponding to barrel identification numbers 1702 and columns corresponding to measurement levels and other indicators, such as liquid level 1704, pH level 1706, brix content 1708, temperature 1710, and ejection indicator 1712, other liquid characteristics, or any combination thereof. In some examples, table 1700 may include attention indicators, alarm indicators, ejected bung location indicator, any other measurements or indicators described throughout this disclosure, or any combination thereof. Further, a user may be able to define which variables and constants are displayed in the rows and columns of table 1700 and may be able to select from any measurements and indicators described throughout this disclosure.

Figure 18:
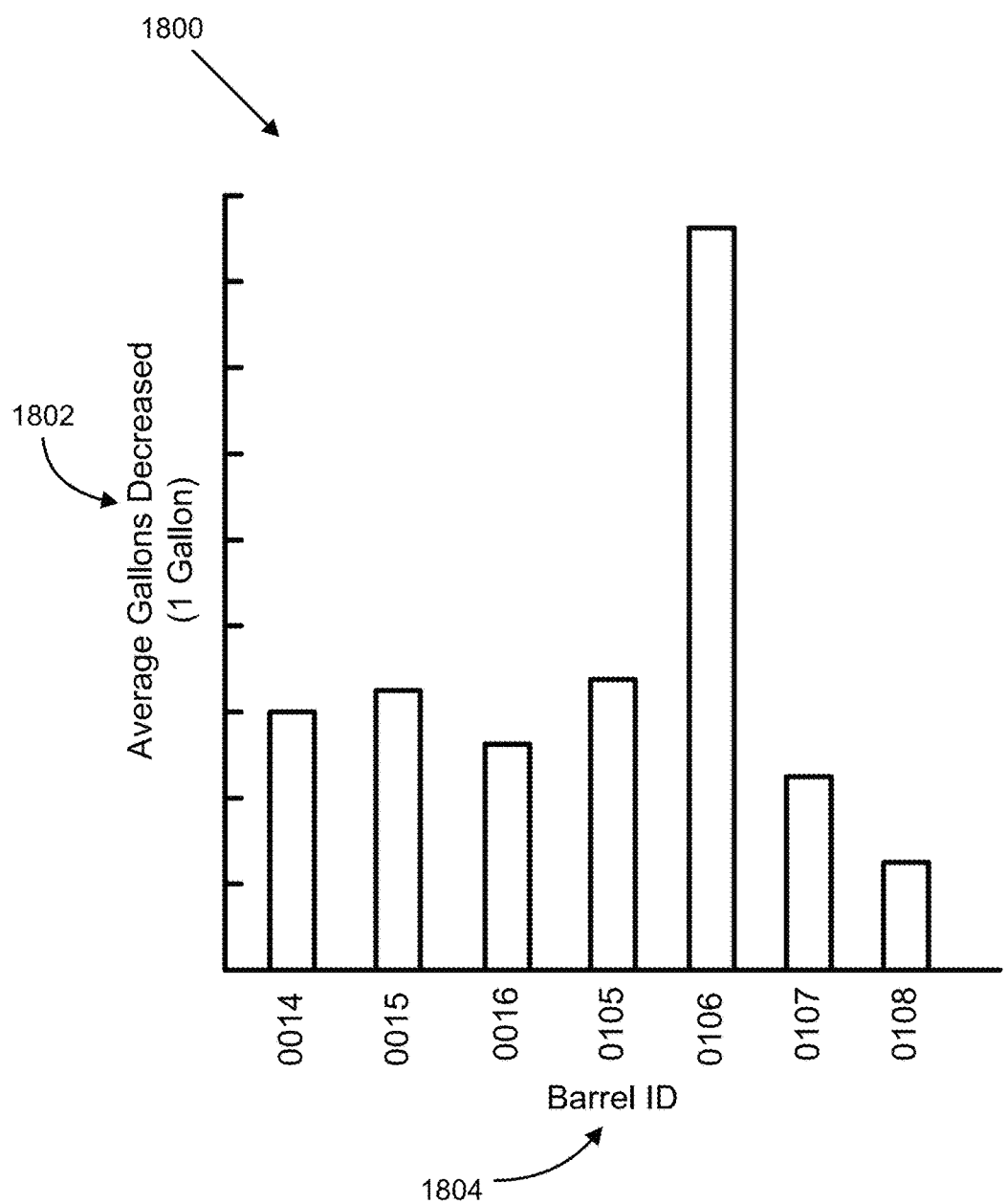
FIG. 18 illustrates an example graph presenting report data.

FIG. 18 illustrates an example graph 1800 presenting report data. Graph 1800 may comprise a bar graph displaying data over a period of time. Graph 1800 may plot a variable, such as average gallons decreased 1802, with respect to a constant, such as barrel ID 1804. In other examples, any of the measurements, indicators, and identifications, such as barrel identification, may be displayed on graph 1800 and may be selected by a user. While a bar graph is illustrated, data may be presented in various different graph or chart types, including scatter plots, pie charts, line graphs, and bubble graphs.

The server 167 may be configured to receive data associated with measurements from liquids stored in a plurality of containers from a plurality of liquid detection apparatuses 151. The server 167 may be further configured to receive a request for a portion of the data in a specific format from the user device 165 and format the portion of the data to the specific format in response to receiving the request. The server 167 may be still further be configured to transmit the formatted portion of the data to the user device 165 for display on the user device 165. In some examples the request may include authorization information and transmission of the portion of the data may depend on verifying that the received authorization information allows the user device 165 access to the data.

Capacitive Sensors

There are many applications in which sensing a liquid level within a container is needed. There are various approaches to determining liquid levels. Using capacitance has an advantage of requiring no moving parts and, with modern electronics, can be accomplished by the use of a low cost microcontroller.

Figure 19:
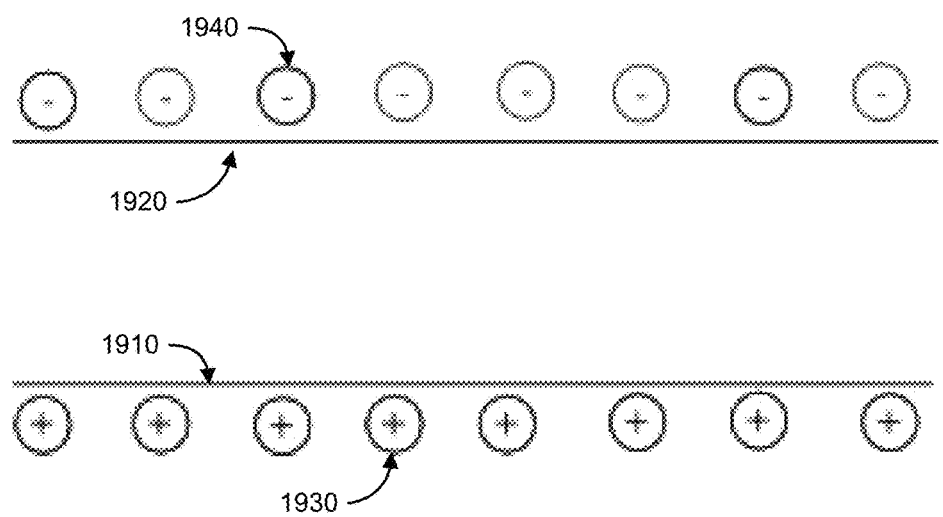
FIG. 19 illustrates an example parallel plate capacitor.

Capacitance is the measure of a structure's ability to contain charge. The parallel plate model is the basic configuration used to explain capacitance. Two conductive plates of area A may be separated by distance d. One plate may be connected to a positive voltage (v) and the other may be connected to ground thus fixing the voltage between the plates at a constant, v. One can imagine positive charge 1930 evenly distributing itself across the plate connected to the positive terminal 1910, and likewise negative charge 1940 evenly distributing itself across the plate connected to the negative terminal 1920, as illustrated in FIG. 19.

Figure 20:
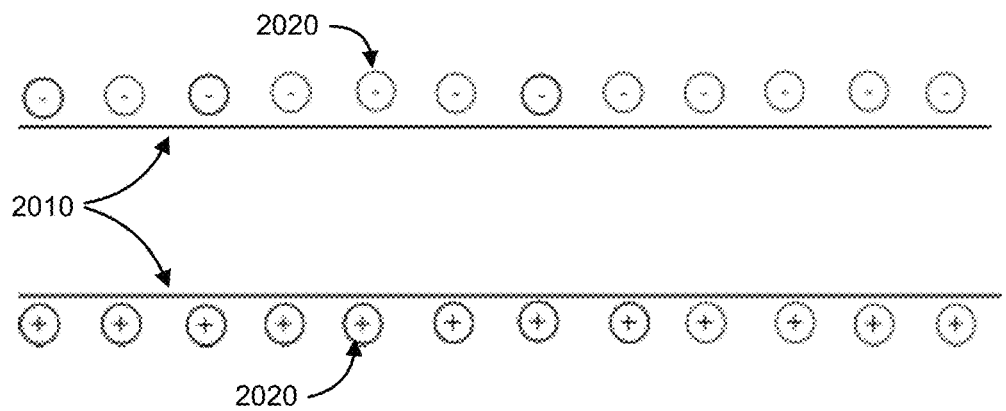
FIG. 20 illustrates an example parallel plate capacitor with extended area.

Opposite charges experience an attraction force while like charges experience a repulsive force. Thus each charge may settle into a position that is as close to the opposite charge, and farthest from the similar charge as possible. If the area of the plates 2010 were increased, more charge 2020 may flow onto the plates 2010 to occupy the new area, meaning that the capacitance is increased, as illustrated in FIG. 20.

Figure 21:
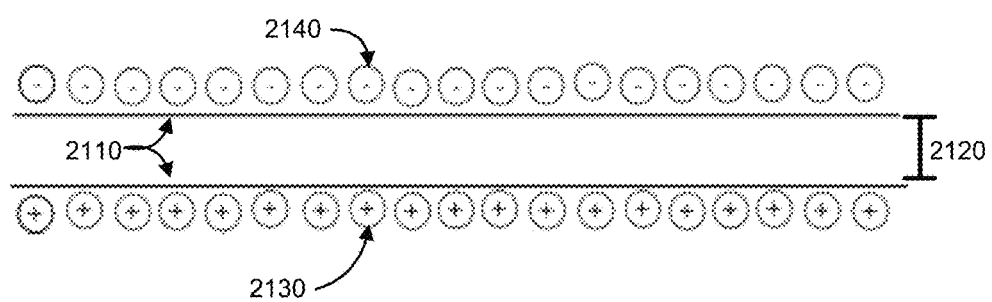
FIG. 21 illustrates an example parallel plate capacitor with reduced distance between the parallel plates.

As the distance 2120 between the plates 2110 decreases, the attraction between the positive charges 2130 and negative charges 2140 intensifies and more of each type of charge may be distributed across the plates 2110. Due to the attraction force between different charges increasing, like charges may tolerate being closer to one another. In FIG. 21, the voltage is being held constant across the plates 2110. When the distance 2120 is decreased the structure is now able to contain more charge 2130 and 2140 for the same voltage, meaning that the capacitance is increased, as illustrated in FIG. 21.

In the parallel plate model, Equation 1 may be used to determine capacitance, C. A is the area of the plates, d is the distance between the plates, and $\varepsilon_o$ and $\varepsilon_r$ are the electric permittivity of free space (which is a constant and identical in all circumstances) and relative permittivity of the material between the plates, respectively.

$$C = \frac{\varepsilon_r \varepsilon_0 A}{d} \qquad \text{Equation 1}$$

The above examples assume there is nothing occupying the space between the plates, which is false in almost all applications. The material found between the plates may be an insulating material which can be thought of as a collection of electric dipoles. In a dipole, the positive and negative charges may be bound together but separated by a distance. These molecules are bound in place but may be able to spin. When influenced by an electric field these dipoles may tend to align themselves with the electric field. These aligned dipoles may cause the electric field to intensify which leads to more charge on the plates, and the capacitance may increase.

Figure 22:
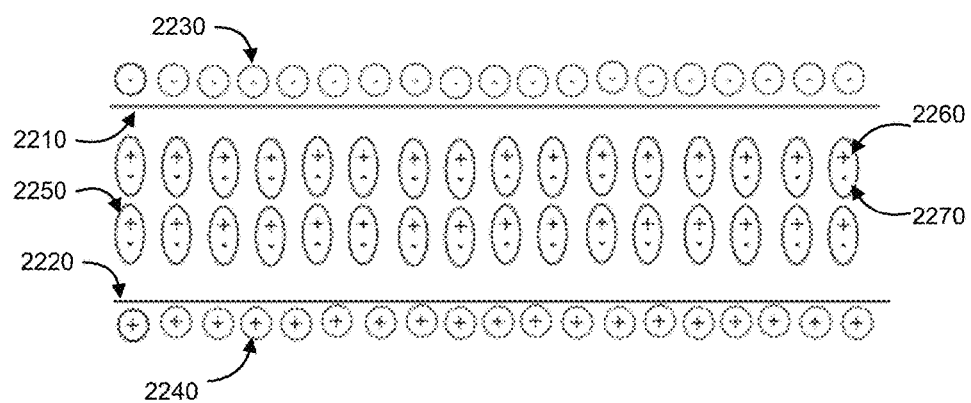
FIG. 22 illustrates an example parallel plate capacitor with electric dipoles located between the parallel plates.

In FIG. 22, in addition to negative charge 2230 on a top plate 2210 and positive charge 2240 on a bottom plate 2220, now there may be electric dipoles 2250 placed between the plates 2210 and 2220. Notice how the dipoles 2250 may align themselves so that the positive side of the dipole 2260 is closest to the negatively charged plate 2210 and the negative side 2270 so it is closest to the positively charged plate 2220. The electric field of each dipole 2250 may interact with the electric field of other dipoles 2250 making certain alignments more probable depending on the strength of the externally applied field.

Different materials may have more or less of an effect on the electric field. A dielectric constant of a material measures how susceptible a material is to aligning and consequently intensifying an external electric field. For example, air has a dielectric constant of very close to 1.0 (but is dependent on pressure, temperature, and humidity), where as water has a dielectric constant of 80. This means that a structure with pure water between the plates has 80 times the capacitance than if air were separating the plates.

Measuring Liquid Levels with Capacitance

When using capacitance to measure liquid level, building sensors onto a circuit board may be a cost effective method. This may provide flexibility as to the shape and size of the sensors. It may be desirable to avoid making any assumptions about the dielectric constant of the liquid or the air contacting the sensors. This way, the sensors may be used in applications where the dielectric constant cannot be predetermined. It may also be desirable to have the ability to determine the liquid level continuously and thus with more resolution. In contrast, having many sensors and making a binary decision if each sensor is covered or uncovered may be less ideal.

Evaluation of a Single Sensor

A total measured capacitance for a sensor may be the sum of the capacitance from the covered and uncovered areas for that sensor. These two areas (covered and uncovered) may be treated as two separate capacitances that are summed to determine a total capacitance of the sensor, as illustrated by Equation 2 and simplified Equation 3.

$$C_{total} = \frac{\varepsilon_{covered}\varepsilon_0 A_{covered}}{d} + \frac{\varepsilon_{uncovered}\varepsilon_0 A_{uncovered}}{d} \quad \text{Equation 2}$$

$$C_{total} = \frac{\varepsilon_0}{d}(\varepsilon_{covered} A_{covered} + \varepsilon_{uncovered} A_{uncovered}), \quad \text{Equation 3}$$

$C_{total}$ is the total capacitance of a sensor.

$\varepsilon_{covered}$ is the relative permittivity of a liquid covering a first portion of the sensor.

$A_{covered}$ is an area of the sensor covered by the liquid.

$\varepsilon_{uncovered}$ is a relative permittivity of a non-liquid substance covering a second portion of the sensor, $\varepsilon_o$ is the electric permittivity of free space.

$A_{uncovered}$ is an area of the sensor covered by the non-liquid substance.

d is a distance between plates of the sensor.

After analyzing a single rectangular sensor shape to determine the liquid level, it is apparent that this sensor configuration may not provide enough information without making assumptions beforehand about the liquid and non-liquid substances. In the case of a single sensor, the area and the relative permittivity of the covered and uncovered substances may be unknown. If the uncovered area can be found, then by extension of knowing the sensor's total area, the covered area may be calculated and translated into a liquid level, as illustrated by Equations 4 and 5.

$$A_{total} = A_{covered} + A_{uncovered} \quad \text{Equation 4:}$$

$$A_{uncovered} = A_{total} - A_{covered} \quad \text{Equation 5:}$$

$A_{total}$ is a total area of a sensor.

$A_{covered}$ is an area of a covered portion of the sensor.

$A_{uncovered}$ is an area of an uncovered portion of the sensor

Substituting this result into Equation 3 yields Equation 6:

$$C_{total} = \frac{\varepsilon_0}{d}(\varepsilon_{covered} A_{covered} + \varepsilon_{uncovered}(A_{total} - A_{covered})) \quad \text{Equation 6}$$

With the single sensor configuration, there may not be enough information to solve the Equation 6 and determine the liquid level.

Evaluation of Multiple Sensors

Vertically Stacked Rectangular Sensors

When using multiple sensors, each sensor has its own capacitance which may be calculated using the same equation we used for the single sensor case.

Figure 23:
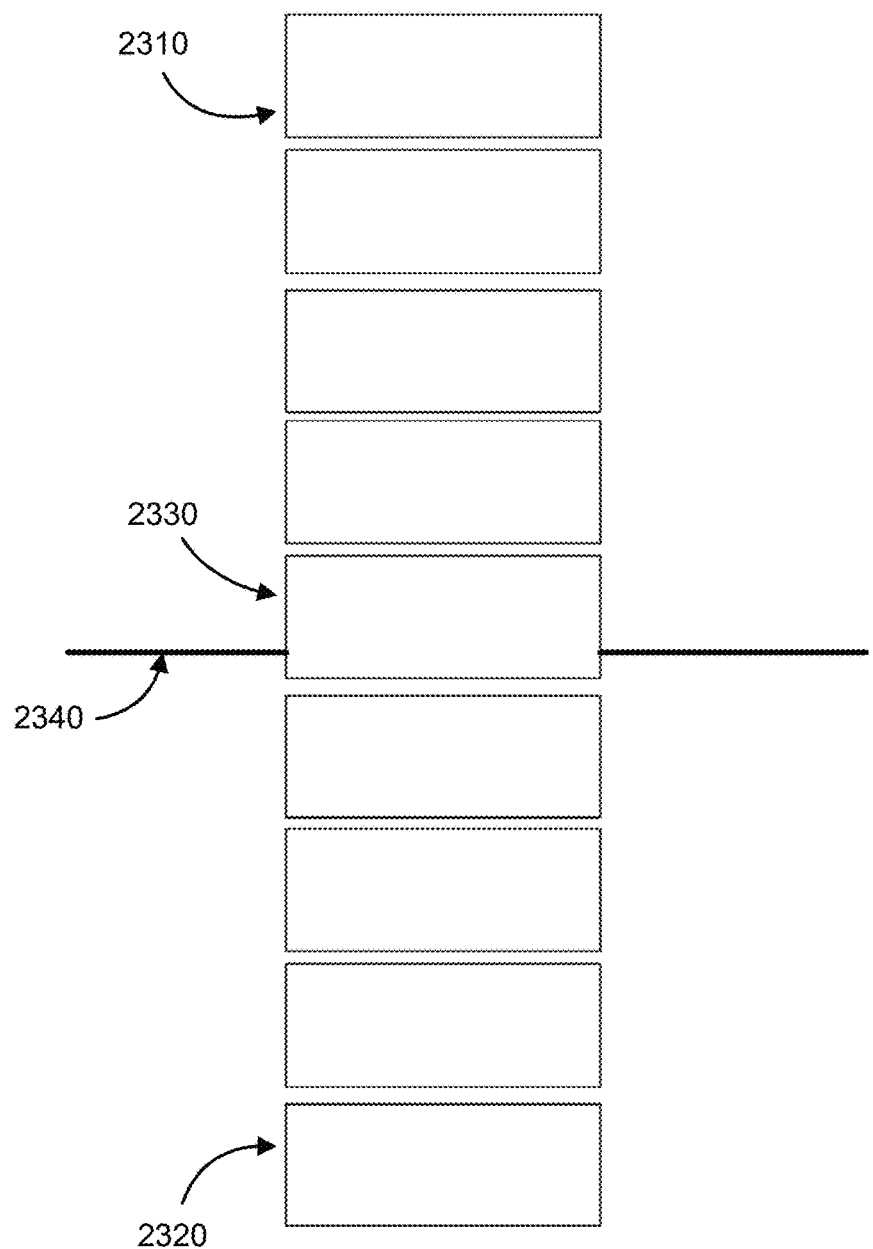
FIG. 23 illustrates an example capacitive sensing device including multiple vertically stacked rectangular sensors and an intersecting liquid level.

We consider three or more vertically stacked rectangular sensors for FIG. 23 and assume a liquid level 2340 lies somewhere on a one of middle sensors 2330 (i.e., a top sensor 2310 is fully uncovered and a bottom sensor 2320 is fully covered). Since for the top sensor 2310, there is no covered area, a formula for a capacitance of the top sensor 2310 may simplify to Equation 1. Similarly, a capacitance of the bottom sensor 2320 may be found using Equation 1, since there is no uncovered area. Using these simplified formulas, a relative permittivity of the covered and uncovered material may both be obtained. Thus, there may be enough information available to find the liquid level 2340.

Figure 24:
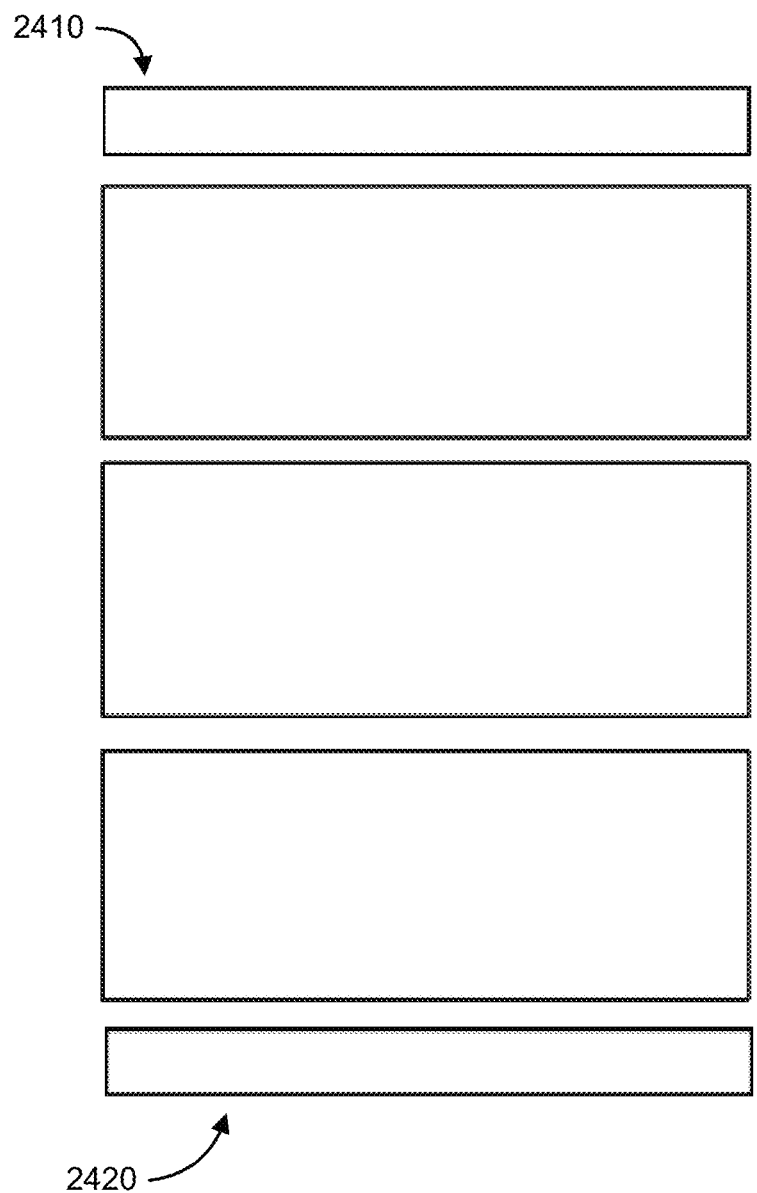
FIG. 24 illustrates an example capacitive sensing device including multiple vertically stacked rectangular sensors with reduced size end sensors.

When the liquid level 2340 is on the top sensor 2310 or the bottom sensor 2320, a precise height of the liquid level may not be determined. In this vertically stacked rectangular sensor arrangement, some area at the top and the bottom of the sensor stack is sacrificed due to this fact. To mitigate this inconvenience, heights of a top sensor 2410 and a bottom sensor 2420 may be reduced minimizing the height that is sacrificed, as illustrated in FIG. 24. In some cases this sacrifice of area is acceptable and leads to simpler calculations in solving for the liquid level.

Complementary Sensors

Figure 25:
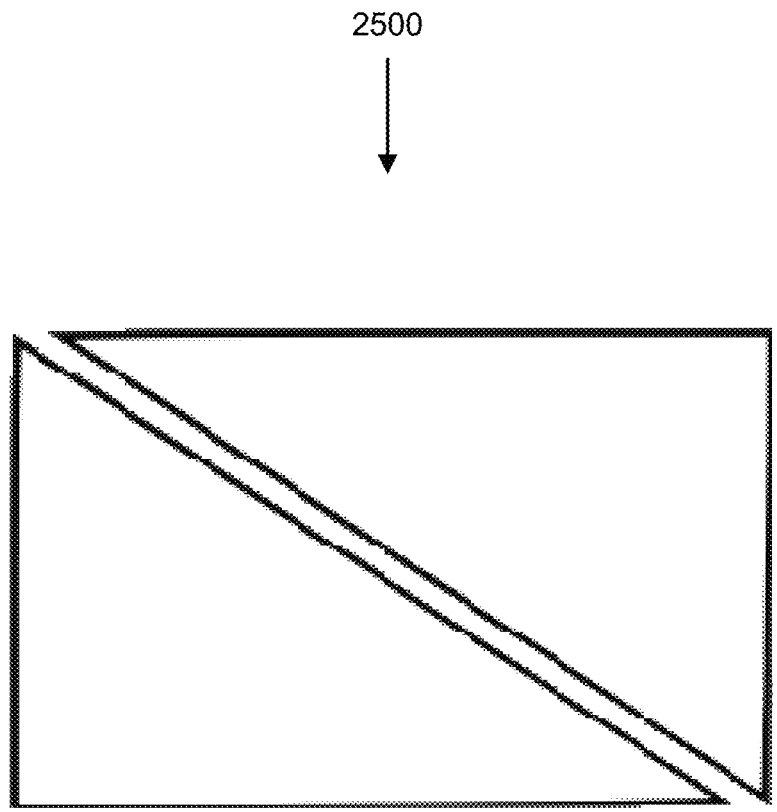
FIG. 25 illustrates an example capacitive sensing device including complementary triangle sensors.

In cases where the sacrifice of area is unacceptable, a more sophisticated arrangement may be required. Two or more pairs of complementary sensors may be used to obtain all the information needed to find the liquid level. One pair of complementary sensors 2500, as illustrated in FIG. 25, may not be enough; at least two pairs of vertically stacked complementary sensors may be needed. The shapes of the pairs of sensors may take on a variety of forms without affecting the functionality of the liquid level measurement. As an example, triangles (as illustrated in FIG. 25) or curved forms may both be acceptable to use.

In the case of triangular sensors, an area covered may be written as a function of the liquid level, as shown in Equation 7, for an area of a triangle with a point facing up. A width and height of the triangular sensor are represented by w and h respectively with the liquid level represented by the variable I.

$$A_{up}(l) = \int (wh - wl)dl = whl - \frac{1}{2}wl^2 \quad \text{Equation 7}$$

The equation for an area covered on a triangle with a point facing down may similarly be quadratic.

$$A_{dn}(l) = \int (wl)dl = \frac{1}{2}wl^2 \qquad \text{Equation 8}$$

The total area for each sensor can be written as:

$$A_{tri} = \frac{1}{2}wh^2 \qquad \text{Equation 9}$$

Using the three equations above, the total capacitance for the triangle with the point facing upwards may be found. Equation 10 is identical to Equation 6, and serves as a starting point for substituting in the above three equations.

$$C_{total} = \frac{\varepsilon_0}{d}(\varepsilon_{covered}A_{covered} + \varepsilon_{uncovered}(A_{total} - A_{covered})) \qquad \text{Equation 10}$$

$$C_{total\ up} = \frac{\varepsilon_0}{d}(\varepsilon_{covered}A_{up}(l) + \varepsilon_{uncovered}(A_{tri} - A_{up}(l))) \qquad \text{Equation 11}$$

$$C_{total\ up} = \frac{\varepsilon_0}{d}(\varepsilon_{covered}A_{up}(l) + \varepsilon_{uncovered}(A_{tot} - A_{up}(l))) \qquad \text{Equation 12}$$

$$C_{total\ up} = \frac{\varepsilon_0}{d}\left(\varepsilon_{covered}whl - \frac{1}{2}wl^2 + \varepsilon_{uncovered}\left(\frac{1}{2}wh^2 - whl + \frac{1}{2}wl^2\right)\right) \qquad \text{Equation 13}$$

Using the same reasoning for the sensor pointing downwards, Equation 14 may be found.

$$C_{total\ down} = \frac{\varepsilon_0}{d}\left(\varepsilon_{covered}\frac{1}{2}wl^2 + \varepsilon_{uncovered}\left(\frac{1}{2}wh^2 - \frac{1}{2}wl^2\right)\right) \qquad \text{Equation 14}$$

Note that both complementary sensors experience the same liquid level. This fact helps to eliminate one unknown; however there may still be too many unknowns to solve for. Relative permittivities of both the covered and uncovered materials may be unknown as well as the liquid level. The added information from introducing a complementary sensor may not be enough to find the liquid level without making assumptions about the covered or uncovered materials.

Stacked Complementary Sensors

Figure 26:
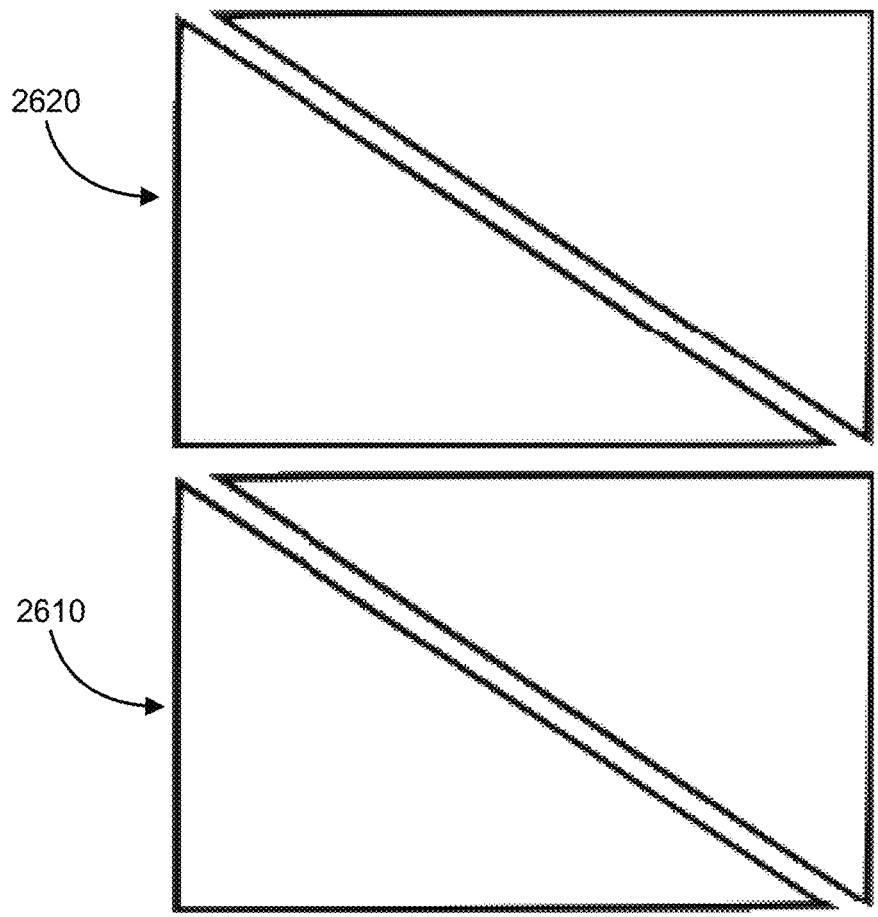
FIG. 26 illustrates an example capacitive sensing device including stacked complementary sensors.

Stacking another pair of complementary sensors, as illustrated by FIG. 26, may provide enough information to solve for a liquid level without making unnecessary assumptions. As in the case of multiple vertically stacked sensors, either a covered or uncovered permittivity may be found, depending on the liquid level. For example, if a liquid is completely covering a bottom pair of sensors 2610 and extends to half way up a top pair of sensors 2620, the liquid's permittivity may be obtained from the bottom pair of sensor readings. Now the complementary relationship of the sensors may provide enough information to solve for the liquid level. In this particular case $\varepsilon_{covered}$ is known, and there are two equations with two unknowns.

Arrangements of smaller rectangular top and bottom sensors or complementary top and bottom sensors as mentioned may be able to correctly deduce a liquid level when a permittivity of each material contacting the sensors is sufficiently different. This means that in some cases these approaches may also function for two types of liquids, or two types of gases. Insulation over the sensors may increase a capacitance added for areas exposed to air or other elements with low permittivity. Being able to properly sense the liquid level through insulation may make using capacitive sensing a viable solution for many new applications. Relatively thick insulation may be used to cover the sensors or an entire circuit coupled to the sensors which enables the use of these methods in industrial applications and harsh environments.

In some examples, complementary sensors may only be required on the top and bottom of the sensor stack. All sensors in between may be rectangular shaped sensors if desired. This sensor configuration may arise to limit the maximum capacitance that the sensing circuitry must drive thus allowing a single large sensor to be broken into many smaller sensors. Stacked complementary sensors, as well as shortened top and bottom sensors in a stack of rectangular sensors are unique.

Figure 27:
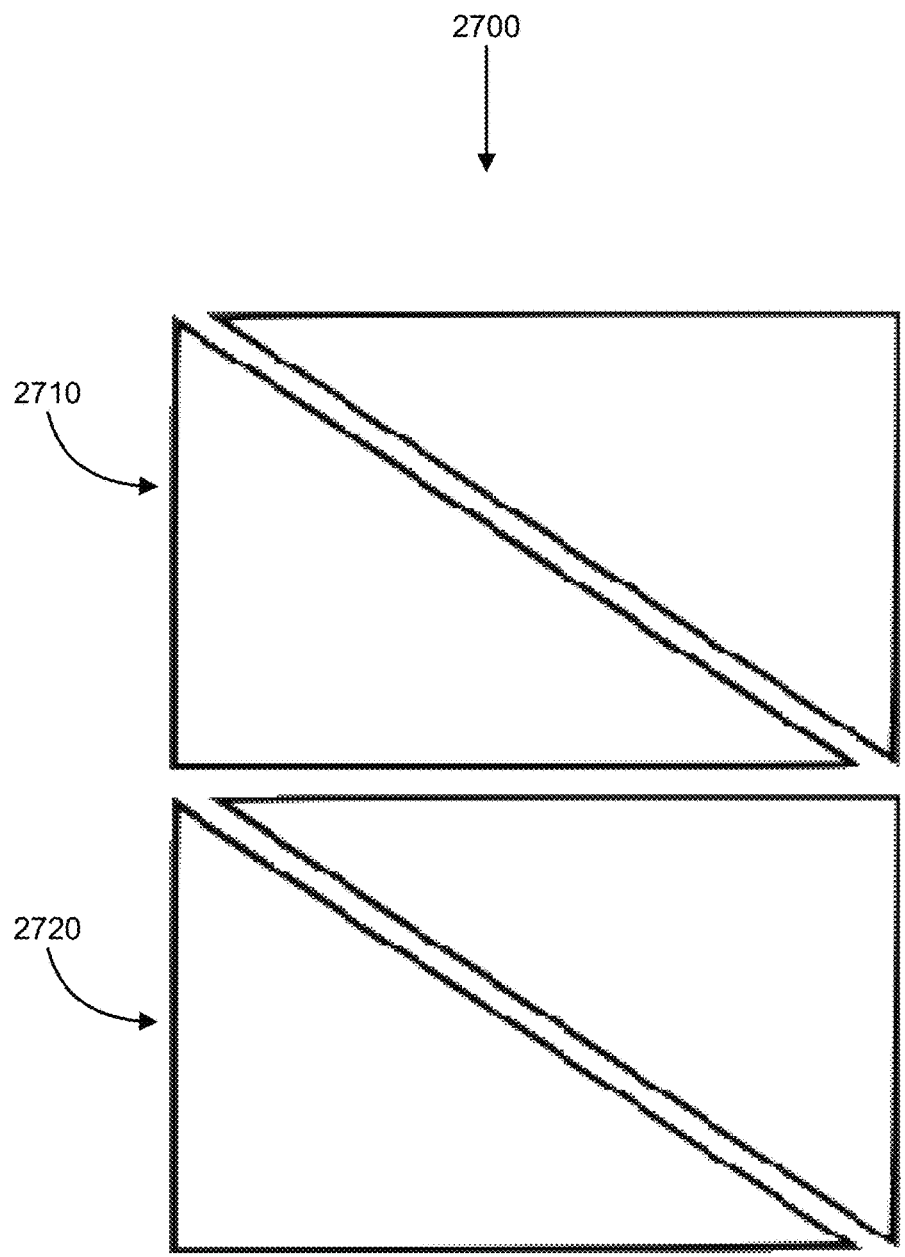
FIG. 27 illustrates an example capacitive sensing device including a plurality of complementary sensors.
Figure 28:
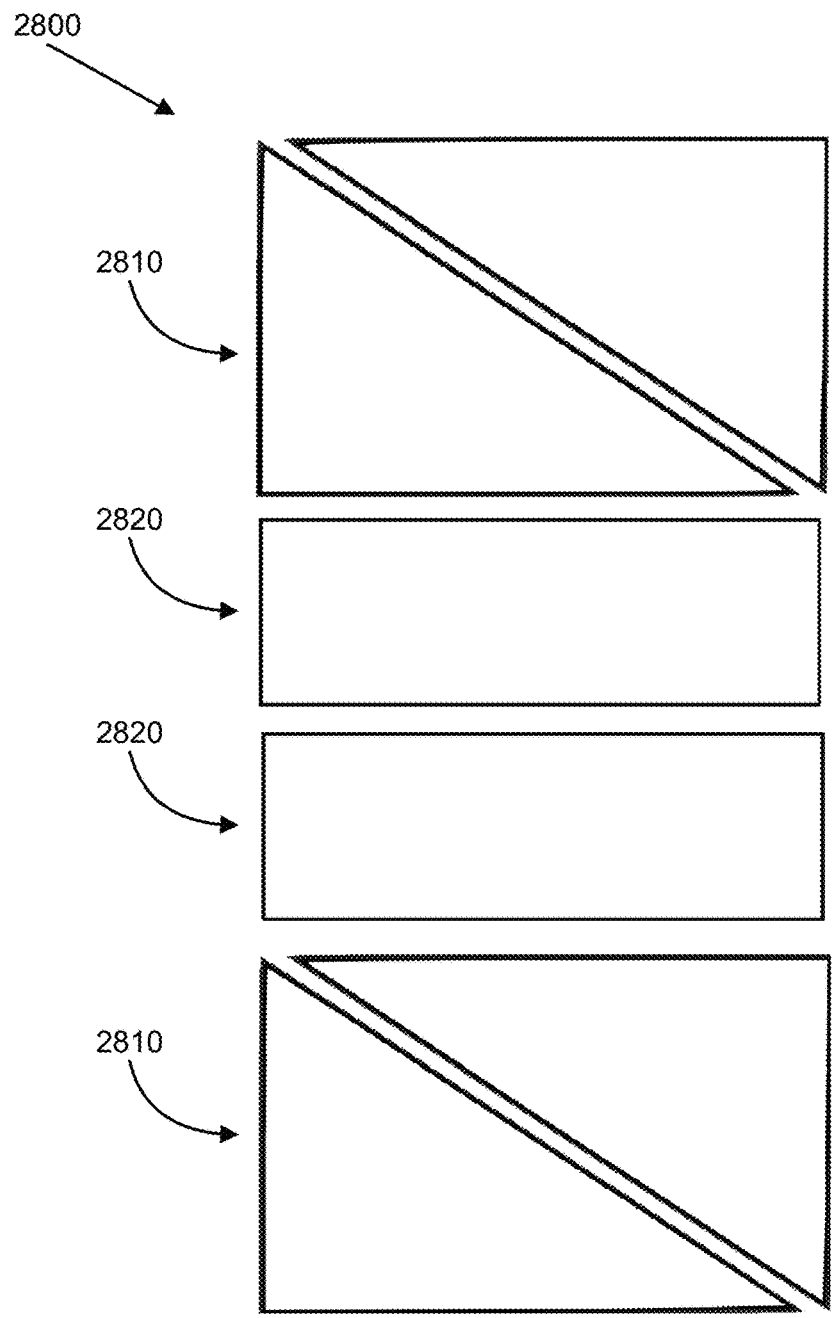
FIG. 28 illustrates an example capacitive sensing device including a combination of complementary sensors and vertically stacked rectangular sensors.
Figure 29:
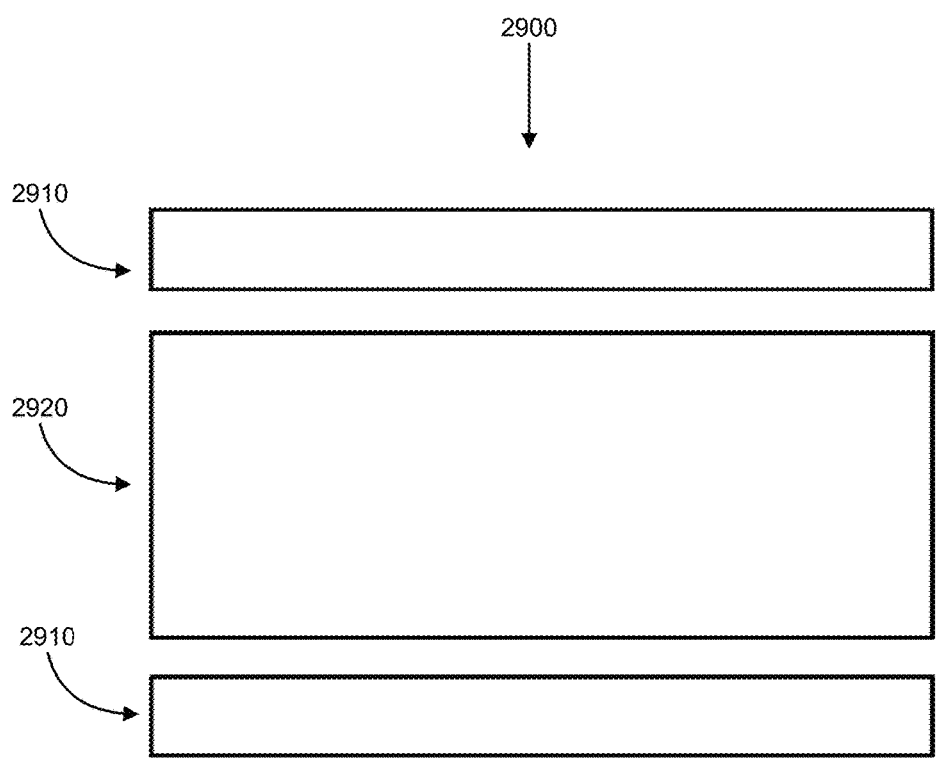
FIG. 29 illustrates an example capacitive sensing device including reduced size end sensors and a single rectangular sensor.
Figure 30:
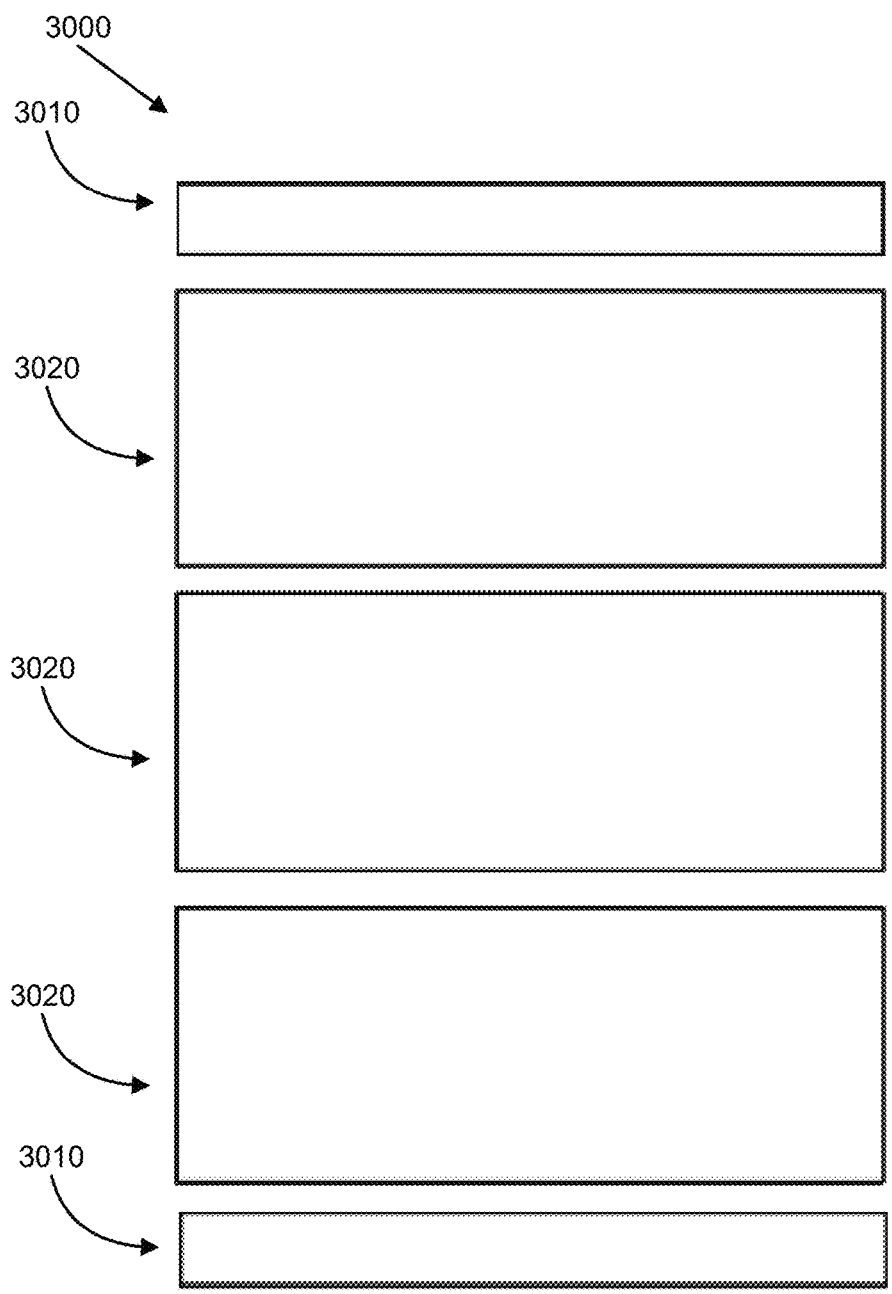
FIG. 30 illustrates an example capacitive sensing device comprising reduced size end sensors and a plurality of vertically stacked rectangular sensors.

FIGS. 27-30 illustrate examples of capacitive sensing devices with sensors in differing configurations. FIG. 27 illustrates an example capacitive sensing device 2700 including a plurality of complementary sensors, including first complementary sensors 2710 and second complementary sensors 2720. FIG. 28 illustrates an example capacitive sensing device 2800 including a combination of complementary sensors 2810 and vertically stacked rectangular sensors 2820. FIG. 29 illustrates an example capacitive sensing device 2900 including shortened end sensors 2910 and a single rectangular sensor 2920. FIG. 30 illustrates an example capacitive sensing device 3000 including shortened end sensors 3010 and a plurality of vertically stacked rectangular sensors 3020. Any example capacitive sensing device, or any combination of the example capacitive sensing devices, may be used to determine a liquid level in an application.

The capacitive sensing devices described above may be utilized for determining a level of a wine in a barrel. In other examples, the capacitive sensing devices may be utilized for determining levels of other liquids within a given environment, such as a level of blood within an intravenous bag, a level of water inside a bottle, a level of gas within a gas tank, liquid in a beaker, rain fall within a container, other similar environments, or any combination thereof. The capacitive sensing devices may be utilized in any environment having two elements having different relative permittivities from each other.

The capacitive sensing device 2900 may include one or more vertically stacked rectangular sensors. The rectangular sensors may be a first sensor height and may be configured to measure a first capacitance associated with the level of the liquid in contact with the capacitive sensing device 2900. The bottom rectangular sensor 2910 may be located below the vertically stacked rectangular sensors 2920 and may be a different height than the vertically stacked rectangular sensors. The bottom rectangular sensor 2910 may be configured to a measure a second capacitance associated with a presence of the liquid. The top rectangular sensor 2910 may be located above the vertically stacked rectangular sensors 2920 and may be the same height as the bottom rectangular sensor 2910. The top rectangular sensor 2910 may be configured to measure a third capacitance associated with an absence of the liquid.

The second capacitance and the third capacitance may be used for determining a relative permittivity of the liquid. Additionally, the first capacitance and the relative permittivity of the liquid may be used for determining the level of the liquid. In some examples, an insulation layer may isolate the liquid from the vertically stacked rectangular sensors 2910, the bottom rectangular sensor 2920, and the top rectangular sensor 2920.

The capacitive sensing device 2700 may include a first pair of complementary sensors 2720 having a first sensor and a second sensor. The first sensor and the second sensor may be the same geometry and may both extend vertically from a first level to a second level. The first sensor and the second sensor may measure a first set of complementary capacitive measurements associated with a vertical level of an element. A second pair of complementary sensors 2710 may be stacked vertically above the first pair of complementary sensors and include a third sensor and a fourth sensor. The third sensor and the fourth sensor may be the same geometry and may both extend vertically from a third level to a fourth level. The third sensor and the fourth sensor may measure a second set of complementary capacitive measurements associated with the vertical level of the element. In some examples, a processing device may be configured to determine the level of the element based on the first set of complementary capacitive measurements and the second set of complementary capacitive measurements.

Barrel Identification Device

Figure 31:
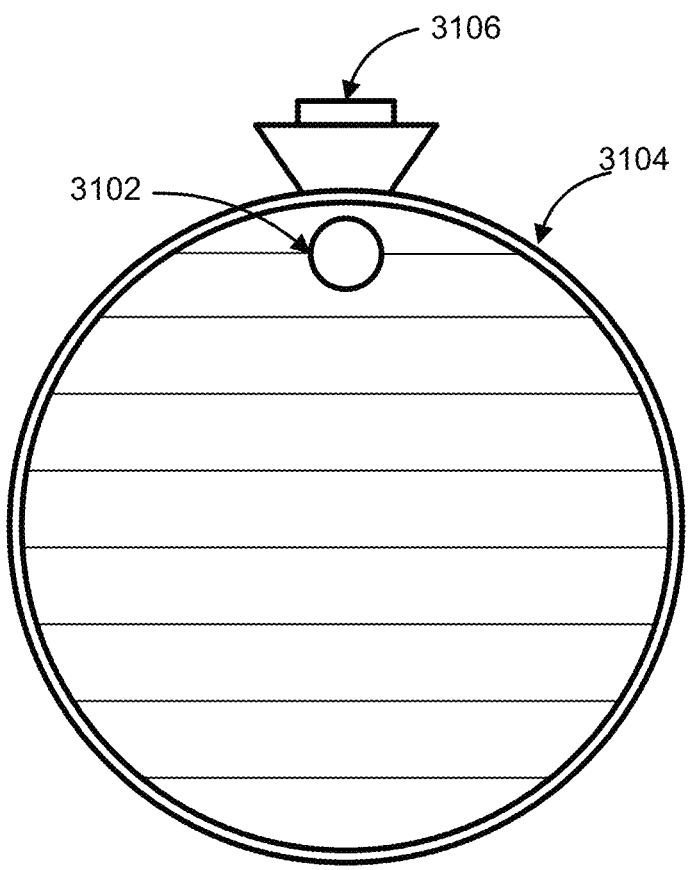
FIG. 31 illustrates an example barrel identification device affixed to a barrel.

FIG. 31 illustrates an example barrel identification device 3102 affixed to a barrel 3104. Barrel identification device 3102 may be affixed to any part of a barrel. Barrel identification device 3102 may comprise a Bluetooth chip and may be about ⅜" in diameter. In other examples, barrel identification device 3102 may be configured to communicate via other communication protocols, including wireless, magnetic, Wi-Fi, near-field, radio, radio frequencies, radio frequency identification (RFID), Bluetooth, other types of communication systems/protocols, or any combination thereof.

Barrel identification device 3102 may be configured to communicate with wireless devices, including any liquid detection apparatus described throughout this disclosure. Barrel identification device 3102 may be configured to transmit an identification number, tag, or any other unique identifier to the wireless devices. In response to receiving the unique identifier, the wireless devices may become associated with the barrel identification device 3102 and may maintain the association until reset. The wireless devices may transmit the unique identifier with any data acquired by the wireless devices, thereby maintaining an association between the data and the barrel identification device 3102. Further, an association may be maintained between the data and the barrel on which the barrel identification device 3102 is affixed.

In some examples, barrel identification device 3102 may be configured for one-way communication and may transmit a unique identifier associated with the barrel identification device 3102. The barrel identification device 3102 may be configured to transmit the unique identifier for a certain range, such as 3 feet, such that only wireless devices within the range may receive the unique identifier and be associated with the barrel identification device 3102. Further, the transmission may be encrypted such that certain devices may be able to decrypt the unique identifier.

Barrel identification device 3102 may be associated with any of the locations described in the location management section corresponding to FIG. 15. Further, functions and benefits described in the location management section may apply to the barrel identification device 3102. Additionally, barrel identification device 3102 may be affixed to any of the locations described in the location management section and may be configured to transmit a unique identifier associated with a location to which it is affixed. Therefore, a wireless device may receive unique identifiers from multiple barrel identification devices, such as barrel identification device 3102, and may become associated with each of the multiple barrel identification devices. For example, a wireless device may become associated with a floor location, a rack location, and a certain barrel by receiving unique identifiers from multiple barrel identification devices affixed to those locations.

In some examples, the barrel identification device 3102 may be affixed to the container 3104. The barrel identification device 3102 may be configured to transmit a unique identifier associated with the container 3104. The transmission from the barrel identification device 3102 may be limited to within a proximity of the barrel identification device 3102. In some examples, wireless device 3106 may be configured to perform measurements of a liquid in the container 3104. The wireless device 3106 may be further configured to receive the unique identifier from the barrel identification device 3102 when the wireless device 3106 is within the proximity of the barrel identification device 3102 and store an association between the wireless device 3106 and the barrel 3104 in response to receiving the unique identifier.

Having described and illustrated examples of systems and methods relating to liquid detection apparatuses, it should be apparent that modifications in arrangement and detail may exist without departing from the principles disclosed herein. Accordingly, it should be understood that that any protection granted is not limited by the disclosure, but extends to any and all modifications and variations falling within the spirit and scope of the following claims.

The invention claimed is:

1. A liquid detection apparatus for monitoring liquid stored in a wine barrel, comprising:
    an upper portion configured to be inserted into an opening of the wine barrel;
    a lower portion configured to extend into the liquid when the upper portion is seated in the opening;
    a sensing device centrally located within the lower portion and completely surrounded by a protective layer that prohibits direct contact between the sensing device and the liquid, wherein the sensing device comprises:
        an upper pair of complementary capacitive sensors located adjacent to each other and configured to concurrently obtain a first set of capacitive measurements of a liquid that intersects both of the adjacent sensors of the upper pair, wherein the upper pair of complementary capacitive sensors includes a first capacitive sensor having a right triangle shaped sensor surface and a second capacitive sensor having a right triangle shaped sensor surface as the first capacitive sensor, and wherein a hypotenuse of the first capacitive sensor is adjacent to a hypotenuse of the second capacitive sensor;
        a lower pair of complementary capacitive sensors located adjacent to each other and configured to concurrently obtain a second set of capacitive measurements for determining a relative permittivity of the liquid, wherein the lower pair of complementary capacitive sensors includes another first capacitive sensor having a right triangle shaped sensor surface and another second capacitive sensor having a right triangle shaped sensor surface, and wherein a hypotenuse of the other first capacitive sensor is adjacent to a hypotenuse of the other second capacitive sensor, and the hypotenuse of the first capacitive sensor is parallel with the hypotenuse of the other first capacitive sensor, wherein the first set of capacitive measurements and the relative permittivity are used to determine the liquid level; and one or more rectangular capacitive sensors located between the upper pair of complementary capacitive sensors and the lower pair of complementary capacitive sensors, wherein the upper pair of complementary capacitive sensors, the one or more rectangular capacitive sensors, and the lower pair of complementary capacitive sensors are vertically arranged with respect to one another;

an aperture extending into a bottom surface of the lower portion and configured to allow the liquid to enter the lower portion and encircle the sensing device, wherein the sensing device is configured to obtain sensed input through the protective layer for the liquid contained in the aperture; and an alert system at least partially located within the upper portion and configured to generate an alert in response to the sensed input obtained by the sensing device indicating the liquid level is below a desired value.

2. The liquid detection apparatus of claim 1, wherein the sensory input obtained by the sensing device comprises a capacitance for the liquid, wherein the alert system is configured to generate the alarm in response to the capacitance being below a desired value, and wherein the sensing device comprises:

a first rectangular capacitive sensor having a first height and configured to sense a first capacitance associated with an absence of the liquid;

a second rectangular capacitive sensor having the first height and residing below the first rectangular capacitive sensor, wherein the second rectangular capacitive sensor is configured to sense a second capacitance associated with a presence of the liquid; and a third rectangular capacitive sensor having a second height greater than the first height, the third rectangular capacitive sensor located between the first rectangular capacitive sensor and the second rectangular capacitive sensor, wherein the third rectangular capacitive sensor is configured to measure a third capacitance for determining a level of the liquid.

3. The liquid detection apparatus of claim 1, wherein the sensory input obtained by the sensing device comprises a capacitance for the liquid, wherein the alert system is configured to generate the alarm in response to the capacitance being below a desired value, and wherein the sensing device comprises:

one or more capacitive sensing electrodes;

a neutral layer bordering the one or more capacitive sensing electrodes and demarcating each of the one or more capacitive sensing electrodes from each other; and a ground layer bordering the neutral layer, the neutral layer separating the ground layer from the one or more capacitive sensing electrodes.

4. The liquid detection apparatus of claim 1, further comprising an accelerometer indicating an orientation of the liquid detection apparatus, wherein the alert system is further configured to generate a second alert in response to a change in the orientation of the liquid detection apparatus.

5. The liquid detection apparatus of claim 1, wherein the liquid detection apparatus further comprises a light located in the upper portion, wherein the light is configured to illuminate in response to the alert system generating the alert.

6. The liquid detection apparatus of claim 1, further comprising an ejection-resisting apparatus affixed to the lower portion, the ejection-resisting apparatus comprising one or more members extending from a perimeter of the lower portion.

7. The liquid detection apparatus of claim 1, further comprising a wireless reading device configured to determine an identification of the wine barrel.

8. The liquid detection apparatus of claim 7, wherein a barrel identification device is attached to the wine barrel, and wherein the wireless reading device is configured to determine the identification of the wine barrel by reading the barrel identification device.

9. A liquid detection apparatus for monitoring liquid within a container for storing wine, comprising:

an upper portion configured to float above a surface level of the liquid in the container, wherein the upper portion moves in a vertical direction within the container as the surface level of the liquid rises or falls due to a change in liquid volume;

a lower portion configured to be submerged in the liquid and to support the upper portion above the liquid;

a signaling device located in the upper portion and configured to transmit a signal and to receive the signal reflected from an inner surface of the container for determining the surface level of the liquid within the container;

a communication device configured to transmit information indicating the surface level of the liquid;

a sensing device located within the lower portion and completely surrounded by a protective layer that prohibits direct contact between the sensing device and the liquid, wherein the sensing device is configured to obtain sensed input for the liquid through the protective layer, and wherein the communication device is further configured to transmit information associated with the sensed input, wherein the sensing device comprises:

an upper pair of complementary capacitive sensors located adjacent to each other and configured to concurrently obtain a first set of capacitive measurements associated with a liquid level that intersects both of the adjacent sensors, wherein the upper pair of complementary capacitive sensors includes a first capacitive sensor having a right triangle shaped sensor surface and a second capacitive sensor having a right triangle shaped sensor surface, and wherein a hypotenuse of the first capacitive sensor is adjacent to a hypotenuse of the second capacitive sensor;

a lower pair of complementary capacitive sensors located adjacent to each other and configured to concurrently obtain a second set of capacitive measurements for determining a relative permittivity of the liquid, wherein the lower pair of complementary capacitive sensors includes another first capacitive sensor having a right triangle shaped sensor surface and another second capacitive sensor having a right triangle shaped sensor surface, and wherein a hypotenuse of the other first capacitive sensor is adjacent to a hypotenuse of the other second capacitive sensor, and the hypotenuse of the first capacitive sensor is parallel with the hypotenuse of the other first capacitive sensor; wherein the first set of capacitive measurements and the relative permittivity are used to determine the liquid level;

one or more rectangular capacitive sensors located between the upper pair of complementary capacitive sensors and the lower pair of complementary capacitive sensors, wherein the upper pair of complementary capacitive sensors, the one or more rectangular capacitive sensors, and the lower pair of complementary capacitive sensors are vertically arranged with respect to one another; and
a processing device configured to determine, as the sensed input,
the first set of capacitive measurements when a difference in capacitance between the capacitive sensors of the upper pair is greater than a difference in capacitance between the capacitive sensors of the lower pair, or
the second set of capacitive measurements when a difference in capacitance between the capacitive sensors of the lower pair is greater than the difference in capacitance between the capacitive sensors of the upper pair; and
an aperture extending into a bottom surface of the lower portion and configured to allow the liquid to enter the lower portion and encircle the sensing device, wherein the sensing device is configured to obtain sensed input through the protective layer for the liquid contained in the aperture.

10. The liquid detection apparatus of claim 9, wherein the processing device is configured to:
determine a unique identifier associated with the container;
determine a liquid level of the liquid stored in the container based on the sensed input;
determine information associated with liquid stored in the container, the information indicating the determined liquid level, and wherein at least a portion of the liquid detection apparatus is submerged in the liquid; and
control the communication device to transmit the information together with the unique identifier to provide a status of the liquid stored in the container.

11. The liquid detection apparatus of claim 10, wherein the processing device is configured to:
generate an alert to be included in the information in response to the liquid level being at or below a desired level or outside a desired range of levels.

12. The liquid detection apparatus of claim 10, wherein the liquid detection apparatus further comprises a temperature sensing device, and the processing device is configured to:
determine, based on an output of the temperature sensing device, a temperature inside the container; and
generate an alert to be included in the information in response to the determined temperature being at or above a desired temperature or outside a desired range of temperatures.

13. The liquid detection apparatus of claim 10, wherein the processing device is configured to:
determine, based on the sensed input, an acceleration of the liquid detection apparatus associated with an ejection of a stopper of the liquid detection apparatus from the container; and
generate an alert to be included in the information in response to the determined acceleration.

14. The liquid detection apparatus of claim 10, wherein the processing device is configured to:
control storage of the information for a period of time;
obtain a request for the information for the period of time; and
control the communication device to transmit the information for the period of time in response to receipt of the request.

15. A liquid detection apparatus for monitoring liquid stored in a wine barrel by floating in the liquid or being submerged in the liquid, the liquid detection apparatus comprising:
an upper portion configured to be inserted into an opening of the wine barrel;
a lower portion configured to extend into the liquid when the upper portion is seated in the opening;
a sensing device located within the lower portion and at least partially surrounded by a protective layer, wherein the sensing device is configured to obtain sensed input for the liquid through the protective layer, the sensing device comprising:
an upper pair of complementary capacitive sensors located adjacent to each other, a lower pair of complementary capacitive sensors located adjacent to each other and below the upper pair of complementary sensors, and a processing device coupled with the upper pair and lower pair of capacitive sensors, the processing device is configured to:
obtain capacitive measurements from the capacitive sensors of the upper pair and the capacitive sensors of the lower pair,
determine, based on the obtained capacitive measurements, a first ratio of a capacitance of air to a total area of the upper pair of capacitive sensors and a second ratio of a capacitance of the liquid to a total area of the lower pair of capacitive sensors,
determine the sensed input using the first ratio when a difference in capacitance between the capacitive sensors of the upper pair is greater than a difference in capacitance between the capacitive sensors of the lower pair,
determine the sensed input using the second ratio when the difference in capacitance between the capacitive sensors of the lower pair is greater than the difference in capacitance between the capacitive sensors of the upper pair, and
determine a liquid level based on the sensed input; and
a communication device configured to transmit information indicating the determined liquid level.

16. The liquid detection apparatus of claim 15, wherein the processing device is configured to:
determine a unique identifier associated with the wine barrel;
determine a liquid level of the liquid stored in the wine barrel based on the sensed input; and
control the communication device to transmit the determined liquid level together with the unique identifier to provide a status of the liquid stored in the wine barrel.

17. The liquid detection apparatus of claim 16, wherein the processing device is configured to:
generate an alert in response to the liquid level being at or below a desired level or outside a desired range of levels; and
control the communication device to transmit the alert together with the unique identifier to provide the status of the liquid stored in the wine barrel.

18. The liquid detection apparatus of claim 16, wherein the liquid detection apparatus further comprises a temperature sensing device, and the processing device is configured to:
determine, based on an output of the temperature sensing device, a temperature inside the wine barrel;

generate an alert in response to the determined temperature being at or above a desired temperature or outside a desired range of temperatures; and control the communication device to transmit the alert together with the unique identifier to provide the status of the liquid stored in the wine barrel.

19. The liquid detection apparatus of claim 16, wherein the processing device is configured to:

control storage of the information for a period of time;

obtain a request for the information for the period of time; and control the communication device to transmit the information for the period of time in response to receipt of the request.

20. The liquid detection apparatus of claim 15, wherein:

the upper pair of complementary capacitive sensors includes a first capacitive sensor having a right triangle shaped sensor surface and a second capacitive sensor having a right triangle shaped sensor surface, and wherein a hypotenuse of the first capacitive sensor is adjacent to a hypotenuse of the second capacitive sensor;

the lower pair of complementary capacitive sensors includes another first capacitive sensor having a right triangle shaped sensor surface and another second capacitive sensor having a right triangle shaped sensor surface, and wherein a hypotenuse of the other first capacitive sensor is adjacent to a hypotenuse of the other second capacitive sensor, and the hypotenuse of the first capacitive sensor is parallel with the hypotenuse of the other first capacitive sensor; and one or more rectangular capacitive sensors located between the upper pair of complementary capacitive sensors and the lower pair of complementary capacitive sensors, wherein the upper pair of complementary capacitive sensors, the one or more rectangular capacitive sensors, and the lower pair of complementary capacitive sensors are vertically arranged with respect to one another.

* * * * *